United States Patent
Iochi

(10) Patent No.: US 7,257,423 B2
(45) Date of Patent: Aug. 14, 2007

(54) BASE STATION APPARATUS AND TRANSMISSION ASSIGNMENT CONTROL METHOD

(75) Inventor: Hitoshi Iochi, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 279 days.

(21) Appl. No.: 10/516,179

(22) PCT Filed: Nov. 4, 2003

(86) PCT No.: PCT/JP03/14049

§ 371 (c)(1),
(2), (4) Date: Nov. 30, 2004

(87) PCT Pub. No.: WO2004/047336

PCT Pub. Date: Jun. 3, 2004

(65) Prior Publication Data

US 2005/0208973 A1    Sep. 22, 2005

(30) Foreign Application Priority Data

Nov. 20, 2002 (JP) .............................. 2002-337257

(51) Int. Cl.
  *H04B 1/38* (2006.01)
  *H04M 1/00* (2006.01)
(52) U.S. Cl. .................. 455/561; 455/522; 455/67.11; 455/63.1; 455/67.13; 455/436; 455/450; 455/453; 370/342; 370/331; 370/335
(58) Field of Classification Search ................ 455/561, 455/562.1, 67.11, 63.1, 522, 67.13, 450, 453, 455/69, 436; 375/260; 370/208, 349, 465, 370/328, 229
See application file for complete search history.

(56) References Cited

U.S. PATENT DOCUMENTS 5,940,430 A    8/1999   Love et al.
6,091,788 A *  7/2000   Keskitalo et al. ........... 375/347

(Continued)

FOREIGN PATENT DOCUMENTS

EP    0963074    12/1999

(Continued)

OTHER PUBLICATIONS

International Search Report dated Feb. 17, 2004.

(Continued)

*Primary Examiner*—Marceau Milord
(74) *Attorney, Agent, or Firm*—Stevens, Davis, Miller & Mosher, LLP

(57) ABSTRACT

Transmission destination determiner 301 selects individual communication terminal apparatus as candidates to transmit packets to and determines a transmission destination apparatus based on CQI signals from these communication terminal apparatuses. Transmission power determiner 302 monitors transmission power resources and determines the transmission power of an HS-PDSCH and the transmission power of a pilot channel. HS-PDSCH SIR estimator 303 estimates the SIR of the HS-PDSCH at the transmission destination apparatus based on the CQI signal and the transmission power. MCS determiner 304 determines the maximum TBS based on the HS-PDSCH SIR and indicates an MCS corresponding to the determined TBS to modulator 153. By this means, it is possible to maximize throughput in consideration of the transmission power of the HS-PDSCH.

12 Claims, 21 Drawing Sheets

U.S. PATENT DOCUMENTS

| | | | |
|---|---|---|---|
| 6,317,435 B1 * | 11/2001 | Tiedemann et al. | 370/441 |
| 6,442,405 B1 * | 8/2002 | Hiramatsu et al. | 455/562.1 |
| 6,456,860 B1 * | 9/2002 | Nakagaki | 455/561 |
| 6,473,623 B1 * | 10/2002 | Benveniste | 455/522 |
| 6,542,481 B2 * | 4/2003 | Foore et al. | 370/329 |
| 6,662,024 B2 * | 12/2003 | Walton et al. | 455/562.1 |
| 6,728,226 B1 * | 4/2004 | Naito | 370/328 |
| 6,735,447 B1 * | 5/2004 | Muller | 455/522 |
| 6,738,646 B2 * | 5/2004 | Miyoshi et al. | 455/561 |
| 6,882,625 B2 * | 4/2005 | Le et al. | 370/238 |
| 6,940,827 B2 * | 9/2005 | Li et al. | 370/278 |
| 6,947,748 B2 * | 9/2005 | Li et al. | 455/450 |
| 6,975,650 B2 * | 12/2005 | Terry et al. | 370/473 |
| 6,990,087 B2 * | 1/2006 | Rao et al. | 370/330 |
| 7,020,110 B2 * | 3/2006 | Walton et al. | 370/334 |
| 7,047,016 B2 * | 5/2006 | Walton et al. | 455/452.1 |
| 7,095,984 B2 * | 8/2006 | Hoshino | 455/67.16 |
| 2002/0154616 A1 * | 10/2002 | Aoyama et al. | 370/335 |

FOREIGN PATENT DOCUMENTS

| | | |
|---|---|---|
| EP | 1204225 | 5/2002 |
| EP | 1217861 | 6/2002 |
| EP | 1229678 | 8/2002 |
| JP | 11508432 | 7/1999 |
| JP | 11355373 | 12/1999 |
| JP | 2002 76985 | 3/2002 |
| JP | 2002 101043 | 4/2002 |
| JP | 2002 118514 | 4/2002 |

OTHER PUBLICATIONS

"UL Signaling for TFRC Selection," 3GPP R1-01-1185, TSG-RAN WG1 #22 meeting, Jeju, South-Korea, Nov. 19-23, 2001, pp. 1-11.
"Revised CQI Proposal," 3GPP R1-02-0675, TSG-RAN-WG1 HSDPA, Paris, France, Apr. 9-12, 2002, pp. 1-8.

* cited by examiner

| CQI | TBS+CRC | NUMBER OF CODES | MODULATION SCHEME | CODE RATE |
|---|---|---|---|---|
| 0 | N/A | OOR | | |
| 1 | 160 | 1 | QPSK | 0.17 |
| 2 | 200 | 1 | QPSK | 0.21 |
| 3 | 260 | 1 | QPSK | 0.27 |
| 4 | 340 | 1 | QPSK | 0.35 |
| 5 | 400 | 1 | QPSK | 0.42 |
| 6 | 480 | 1 | QPSK | 0.50 |
| 7 | 680 | 2 | QPSK | 0.35 |
| 8 | 820 | 2 | QPSK | 0.43 |
| 9 | 960 | 2 | QPSK | 0.50 |
| 10 | 1290 | 3 | QPSK | 0.45 |
| 11 | 1520 | 3 | QPSK | 0.53 |
| 12 | 1780 | 3 | QPSK | 0.62 |
| 13 | 2300 | 4 | QPSK | 0.60 |
| 14 | 2610 | 4 | QPSK | 0.68 |
| 15 | 3330 | 5 | QPSK | 0.69 |
| 16 | 3590 | 5 | 16-QAM | 0.37 |
| 17 | 4200 | 5 | 16-QAM | 0.44 |
| 18 | 4700 | 5 | 16-QAM | 0.49 |
| 19 | 5300 | 5 | 16-QAM | 0.55 |
| 20 | 5910 | 5 | 16-QAM | 0.62 |
| 21 | 6600 | 5 | 16-QAM | 0.69 |
| 22 | 7200 | 5 | 16-QAM | 0.75 |
| 23 | 9750 | 7 | 16-QAM | 0.73 |
| 24 | 11500 | 8 | 16-QAM | 0.75 |
| 25 | 14400 | 10 | 16-QAM | 0.75 |
| 26 | 17300 | 12 | 16-QAM | 0.75 |
| 27 | 21600 | 15 | 16-QAM | 0.75 |
| 28 | 23300 | 15 | 16-QAM | 0.81 |
| 29 | 24300 | 15 | 16-QAM | 0.84 |
| 30 | 25500 | 15 | 16-QAM | 0.89 |
| 31 | RSVD | | | |

| CQI | MODULATION SCHEME | | | | | | | |
|---|---|---|---|---|---|---|---|---|
| | QPSK | | | | 16QAM | | | |
| | NUMBER OF CODES | | | | NUMBER OF CODES | | | |
| | 1 | 2 | 3 | ... | 15 | 1 | 2 ... 5 | ... | 15 |
| 0 | TB(1,1) | | | | | | | |
| 1 | TB(2,1) | | | | | | | |
| 2 | | | | | | | | |
| ... | | | | | | | | |
| 10 | | | TB(10,3) | | | | | |
| ... | | | | | | | | |
| 15 | | | | | TB(15,15) | | | |
| 16 | | | | | | | TB(16,20) | |
| ... | | | | | | | | |
| 29 | | | | | | | | TB(29,30) |
| 30 | | | | | | | | TB(30,30) |

| HS-PDSCH SIR [dB] | MODULATION SCHEME | | | | | | | | |
|---|---|---|---|---|---|---|---|---|---|
| | QPSK | | | | | 16QAM | | | |
| | NUMBER OF CODES | | | | | NUMBER OF CODES | | | |
| | 1 | 2 | 3 | ... | 15 | 1 | 2 | 3 | ... | 15 |
| −3.5 | TB(−3.5,1) | TB(−3.5,2) | ... | | TB(−3.5,15) | TB(−3.5,15) | TB(−3.5,17) | ... | TB(−3.5,30) |
| −2.5 | TB(−2.5,1) | | | | | TB(−2.5,16) | | | |
| . 1.5 . | | | | | | | | | |
| . 6.5 . | | ... | | | | ... | | | |
| . 11.5 . | | | | | | | | | |
| . 16.5 . | | | | | | | | | |
| . 21.5 . | | | | | | | | | |
| 25.5 | TB(25.5,1) | | | | TB(25.5,15) | TB(25.5,16) | | | TB(25.5,30) |

FIG.6

|  |  | QPSK | | | | | 16-QAM | | | | |
|---|---|---|---|---|---|---|---|---|---|---|---|
|  |  | 1code | 2code | 3code | 4code | 5code | 1code | 2code | 3code | 4code | 5code |
| HS-PDSCH SIR [dB] | -3.5 | 100 | | | | | | | | | |
| | -2.5 | 150 | | | | | | | | | |
| | -1.5 | 200 | 300 | | | | | | | | |
| | -0.5 | 250 | 370 | | | | | | | | |
| | 0.5 | 300 | 440 | 450 | | | 300 | | | | |
| | 1.5 | 350 | 510 | 550 | 600 | | 380 | | | | |
| | 2.5 | 400 | 580 | 650 | 730 | 800 | 460 | | | | |
| | 3.5 | | 650 | 750 | 860 | 960 | 540 | 600 | 820 | 1000 | |
| | 4.5 | | 720 | 850 | 990 | 1120 | 620 | 730 | 1000 | 1250 | 1300 |
| | 5.5 | | 790 | 950 | 1120 | 1280 | 700 | 860 | 1180 | 1500 | 1600 |
| | 6.5 | | | 1050 | 1250 | 1440 | 780 | 990 | 1360 | 1750 | 1900 |
| | 7.5 | | | 1150 | 1380 | 1600 | | 1120 | 1540 | 2000 | 2200 |
| | 8.5 | | | | 1510 | 1760 | | 1250 | 1720 | 2250 | 2500 |
| | 9.5 | | | | | 1920 | | 1380 | 1900 | 2500 | 2800 |
| | 10.5 | | | | | | | 1510 | 2080 | 2750 | 3100 |
| | 11.5 | | | | | | | | 2260 | 3000 | 3400 |
| | 12.5 | | | | | | | | | | 3700 |
| | 13.5 | | | | | | | | | | 4000 |

FIG.8A

|  |  | QPSK | | | | | 16-QAM | | | | |
|---|---|---|---|---|---|---|---|---|---|---|---|
|  |  | 1code | 2code | 3code | 4code | 5code | 1code | 2code | 3code | 4code | 5code |
| HS-PDSCH SIR [dB] | -3.5 | 0.25 | | | | | | | | | |
| | -2.5 | 0.38 | | | | | | | | | |
| | -1.5 | 0.50 | | | | | | | | | |
| | -0.5 | 0.63 | 0.38 | | | | | | | | |
| | 0.5 | 0.75 | 0.46 | 0.38 | | | 0.38 | | | | |
| | 1.5 | 0.88 | 0.55 | 0.46 | 0.38 | | 0.48 | | | | |
| | 2.5 | 1.00 | 0.64 | 0.54 | 0.46 | 0.40 | 0.58 | | | | |
| | 3.5 | | 0.73 | 0.63 | 0.54 | 0.48 | 0.68 | 0.38 | 0.34 | | |
| | 4.5 | | 0.81 | 0.71 | 0.62 | 0.56 | 0.78 | 0.46 | 0.42 | 0.39 | 0.33 |
| | 5.5 | | 0.90 | 0.79 | 0.70 | 0.64 | 0.88 | 0.54 | 0.49 | 0.47 | 0.40 |
| | 6.5 | | | 0.88 | 0.78 | 0.72 | 0.98 | 0.62 | 0.57 | 0.55 | 0.48 |
| | 7.5 | | | 0.96 | 0.86 | 0.80 | | 0.70 | 0.64 | 0.63 | 0.55 |
| | 8.5 | | | | 0.94 | 0.88 | | 0.78 | 0.72 | 0.70 | 0.63 |
| | 9.5 | | | | | 0.96 | | 0.86 | 0.79 | 0.78 | 0.70 |
| | 10.5 | | | | | | | 0.94 | 0.87 | 0.86 | 0.78 |
| | 11.5 | | | | | | | | 0.94 | 0.94 | 0.85 |
| | 12.5 | | | | | | | | | | 0.93 |
| | 13.5 | | | | | | | | | | 1.00 |

FIG.8B

|  |  | QPSK | | | | | 16-QAM | | | | |
|---|---|---|---|---|---|---|---|---|---|---|---|
|  |  | 1code | 2code | 3code | 4code | 5code | 1code | 2code | 3code | 4code | 5code |
| HS-PDSCH SIR [dB] | -3.5 | 100 | | | | | | | | | |
| | -2.5 | 150 | | | | | | | | | |
| | -1.5 | 200 | | | | | | | | | |
| | -0.5 | 250 | | | | | | | | | |
| | 0.5 | 300 | | | | | | | | | |
| | 1.5 | 350 | | | | | | | | | |
| | 2.5 | 400 | 580 | | | | | | | | |
| | 3.5 | | 650 | 750 | | | 540 | | | | |
| | 4.5 | | 720 | 850 | 990 | | 620 | | | | |
| | 5.5 | | 790 | 950 | 1120 | 1280 | 700 | | | | |
| | 6.5 | | | 1050 | 1250 | 1440 | 780 | 990 | | | |
| | 7.5 | | | 1150 | 1380 | 1600 | | 1120 | 1540 | 2000 | |
| | 8.5 | | | | 1510 | 1760 | | 1250 | 1720 | 2250 | 2500 |
| | 9.5 | | | | | 1920 | | 1380 | 1900 | 2500 | 2800 |
| | 10.5 | | | | | | | 1510 | 2080 | 2750 | 3100 |
| | 11.5 | | | | | | | | 2260 | 3000 | 3400 |
| | 12.5 | | | | | | | | | | 3700 |
| | 13.5 | | | | | | | | | | 4000 |

FIG.10A

|  |  | QPSK | | | | | 16-QAM | | | | |
|---|---|---|---|---|---|---|---|---|---|---|---|
|  |  | 1code | 2code | 3code | 4code | 5code | 1code | 2code | 3code | 4code | 5code |
| HS-PDSCH SIR [dB] | -3.5 | 0.25 | | | | | | | | | |
| | -2.5 | 0.38 | | | | | | | | | |
| | -1.5 | 0.50 | | | | | | | | | |
| | -0.5 | 0.63 | | | | | | | | | |
| | 0.5 | 0.75 | | | | | | | | | |
| | 1.5 | 0.88 | | | | | | | | | |
| | 2.5 | 1.00 | 0.64 | | | | | | | | |
| | 3.5 | | 0.73 | 0.63 | | | 0.68 | | | | |
| | 4.5 | | 0.81 | 0.71 | 0.62 | | 0.78 | | | | |
| | 5.5 | | 0.90 | 0.79 | 0.70 | 0.64 | 0.88 | | | | |
| | 6.5 | | | 0.88 | 0.78 | 0.72 | 0.98 | 0.62 | | | |
| | 7.5 | | | 0.96 | 0.86 | 0.80 | | 0.70 | 0.64 | 0.63 | |
| | 8.5 | | | | 0.94 | 0.88 | | 0.78 | 0.72 | 0.70 | 0.63 |
| | 9.5 | | | | | 0.96 | | 0.86 | 0.79 | 0.78 | 0.70 |
| | 10.5 | | | | | | | 0.94 | 0.87 | 0.86 | 0.78 |
| | 11.5 | | | | | | | | 0.94 | 0.94 | 0.85 |
| | 12.5 | | | | | | | | | | 0.93 |
| | 13.5 | | | | | | | | | | 1.00 |

FIG.10B

BASE STATION APPARATUS AND TRANSMISSION ASSIGNMENT CONTROL METHOD

TECHNICAL FIELD

The present invention relates to a base station apparatus and a transmission assignment control method in a wireless communication system that performs adaptive modulation in high speed downlink packet access, and is suitable to apply to, for instance, a base station apparatus.

BACKGROUND ART

In the field of wireless communications, high speed downlink packet transport schemes are being developed, whereby a plurality of communication terminal apparatuses share a high speed and high capacity downlink channel and a base station apparatus transmits packets to the communication terminal apparatuses. High speed downlink packet transport schemes employ scheduling and adaptive modulation techniques for improved transmission rates.

A scheduling technique refers to a technique of having a base station apparatus set the communication terminal apparatus to be the transmission destination (hereinafter referred to as "transmission destination apparatus") of high speed downlink packets on a per time slot basis and assign the packets to transmit to the transmission destination apparatus. Moreover, an adaptive modulation technique refers to a technique of determining modulation schemes and error correction coding schemes (MCS: Modulation and Coding Scheme) adaptively according to the propagation path conditions of the communication terminal apparatus to transmit the packets to.

Moreover, a wireless communication system that performs high speed packet transport employs ARQ (Automatic Repeat Request), especially H-ARQ (Hybrid-Automatic Repeat Request), for improved data reception performance. ARQ refers to a technique of having the transmitter apparatus automatically perform the process of retransmitting a data unit (e.g., packet) in which an error is detected in the receiver apparatus, and H-ARQ refers to a technique of having the transmitter apparatus select specific bits and transmit them to the receiver apparatus upon retransmission so that the receiver apparatus is able to combine the retransmission signal and an earlier received signal. H-ARQ has the CC (Chase Combining) scheme that applies to packets the same coding as applied in the initial transmission and retransmits these packets, and the IR (Incremental Redundancy) scheme that applies to packets different coding than in the initial transmission and retransmits these packets.

An overview of the operation of a base station apparatus and a communication terminal apparatus that perform high speed packet transport using the scheduling and adaptive modulation techniques will be explained below.

The base station apparatus predicts channel quality based on downlink channel condition report values (e.g., CQI: Channel Quality Indicator) transmitted from each communication terminal apparatus, determines the communication terminal apparatus of the highest channel quality as the transmission destination apparatus, and assigns packets for this transmission destination apparatus in each time slot. In addition, based on the channel quality predicted, the base station apparatus also determines the TBS (Transport Block Size), the number of spreading codes (hereinafter referred to as "the number of codes"), modulation scheme, code rate, and transmission power. Then, the base station apparatus performs the error correction coding and modulation of the packets according to the above-determined specifics and transmits the result to the transmission destination apparatus. The base station apparatus also transmits scheduling information representing the scheduling result to the transmission destination apparatus.

Based on the scheduling information received, each communication terminal apparatus performs demodulation, decoding, and CRC detection in the time slot in which the packets for the apparatus is assigned, according to the modulation scheme and code rate determined in the base station apparatus. When the packet data is accurately decoded, the communication terminal apparatus transmits an ACK signal indicating that to the base station apparatus, and, when the packet data is not decoded accurately, the communication terminal apparatus transmits a NACK signal indicating that to the base station apparatus.

The base station apparatus transmits new data upon receiving the ACK signal and retransmits the same data upon receiving the NACK signal.

Thus, according to the high speed downlink packet transport scheme, all the communication terminal apparatuses in a sector share one channel and transmit packets efficiently, thereby enabling effective use of code resources.

Conventionally, as described above, the base station apparatus determines the TBS, the number of codes, modulation scheme (combination of these will be referred to as "TFRC": Transport Format and Resource Combination) and transmission power based on CQI's from each communication terminal apparatus. More specifically, these are determined with reference to a table, disclosed, for example, in 3GPP, R1-02-0675, "Revised CQI Proposal" by Motorola, Ericsson. FIG. 1 shows the CQI table disclosed in the above-identified document, in which TFRC's and CQI's are associated. Here, for each CQI, a TFRC to satisfy the FER (Frame Error Rate) of 0.1 in one transmission is determined by simulation.

The above document shows that in simulation the SIR (Signal to Interference Ratio) of an HS-PDSCH (High Speed-Physical Downlink Shared Channel) that will result in the FER of 0.1, is determined by following formula (1):

$$SIR[\text{dB}] = -4.5 + CQI \quad (1)$$

Here, in the case of FIG. 1, a CQI assumes a value between 1 and 30, and −4.5 is a constant, provided that the system adopts HSDPA, a communication terminal apparatus uses a RAKE receiver, and the propagation environment shows the static characteristics of one path, FER=0.1.

To achieve the relationship of (1), the relationship between the transmission power of the HS-PDSCH ($P_{HS\text{-}PDSCH}$) the transmission power of a pilot channel (CPICH: Common Pilot Channel) ($P_{CPICH}$), and offset Γ satisfy following formula (2).

$$P_{HS\text{-}PDSCH} = P_{CPICH} + \Gamma \quad (2)$$

However, referring to FIG. 1, simulation is not performed for all possible TFRC combinations, and so FIG. 1 presents the simulation results only partially. FIG. 2 is FIG. 1 shown in a different chart, in which the CQI's and the numbers of codes are associated on a per modulation scheme basis. In the hatched portion of FIG. 2, it may be possible to set a greater TBS than the TBS indicated in the CQI table of FIG. 2, which corresponds to the problem that the throughput is not yet maximized.

In addition, the transmission power of the HS-PDSCH is determined depending on how the base station apparatus distributes transmission power resources to communication terminal apparatuses. When there is a shortage of transmission power resources, the relationship represented in formula (2) may not always be achieved. Consequently, when formula (2) is not possible, formula (1) is not possible either, and it is not adequate to determine the TFRC from the CQI table based on the CQI's reported from the communication terminal apparatuses without taking into consideration the transmission power of the HS-PDSCH.

DISCLOSURE OF THE INVENTION

It is therefore an object of the present invention to provide a base station apparatus and a scheduling method that make possible maximization of throughput in consideration of the transmission power of HS-PDSCH.

The above object is achieved by determining the maximum transport block size that satisfies a given channel quality level and the combination of the number of spreading codes to be used and the modulation scheme, according to channel report values (CQI: Channel Quality Indicator) that indicate the channel quality of an HS-PDSCH and downlink channel quality based on transmission power resources.

BRIEF DESCRIPTION OF DRAWINGS

FIG. 1 shows a conventional CQI table;

FIG. 2 is a schematic diagram of a conventional CQI table that associates the CQI's and the numbers of codes on a per individual modulation scheme basis;

FIG. 6 is a schematic view of a TBS table in a MCS determiner in the base station apparatus according to Embodiment 1 of the present invention;

FIG. 8A shows the TBS table according to Embodiment 1 of the present invention;

FIG. 8B shows code rates corresponding to individual TBS's according to Embodiment 1 of the present invention;

FIG. 10A shows a TBS table according to Embodiment 2 of the present invention;

FIG. 10B shows code rates corresponding to individual TBS's according to Embodiment 2 of the present invention;

BEST MODE FOR CARRYING OUT THE INVENTION

Now, embodiments of the present invention will be described below with reference to the accompanying drawings.

EMBODIMENT 1

Figure 3:
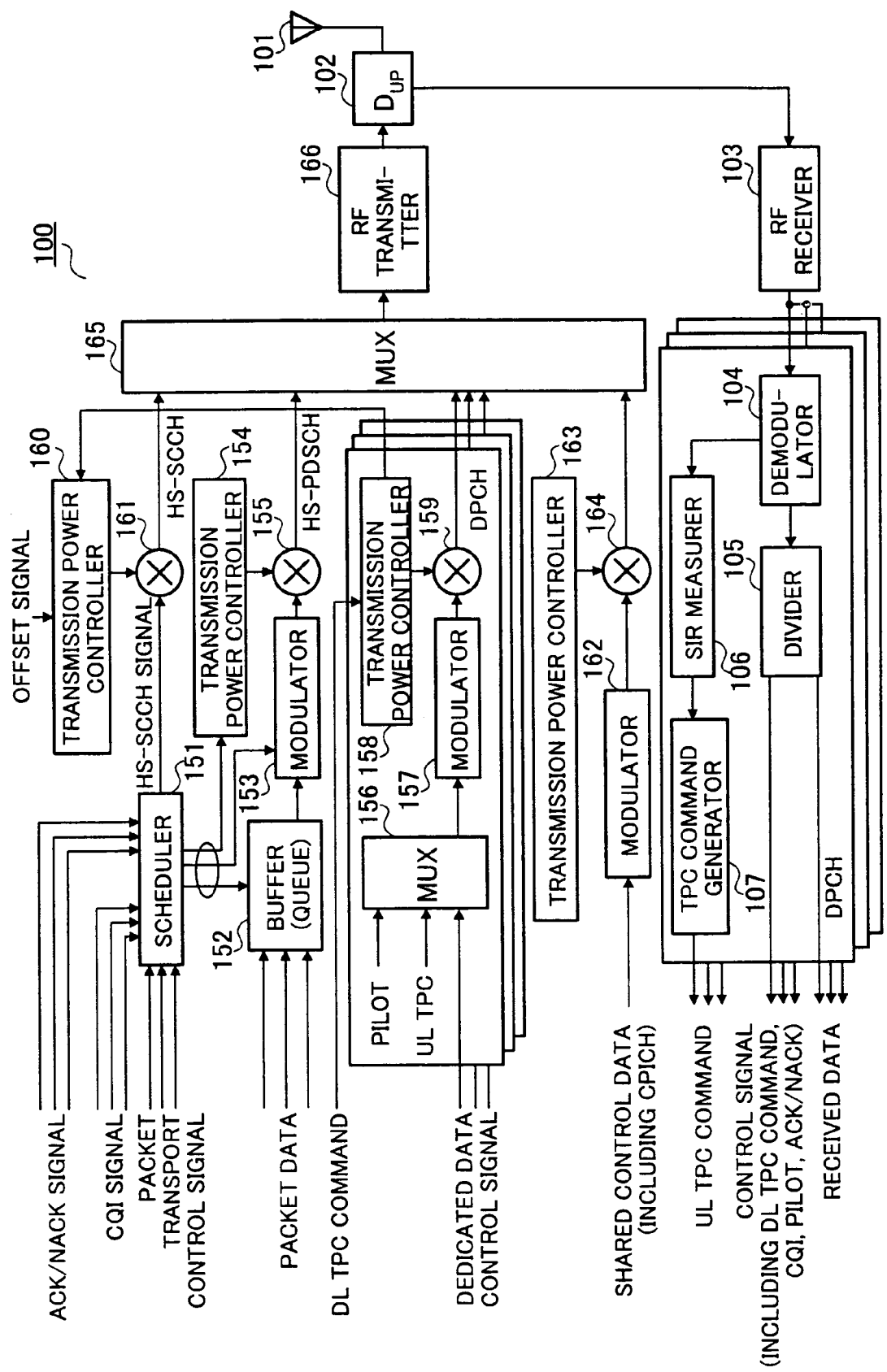
FIG. 3 is a block diagram showing a configuration of a base station apparatus according to Embodiment 1 of the present invention.

FIG. 3 is a block diagram showing a configuration of a base station apparatus according to Embodiment 1 of the present invention. The functions of the individual components of base station apparatus 100 shown in FIG. 3 will be described below.

Duplexer ($D_{UP}$) 102 outputs a signal received by antenna 101 to RF receiver 103. In addition, duplexer 102 transmits a signal output from RF transmitter 166 by radio from antenna 101.

RF receiver 103 converts the received signal of radio frequency output from duplexer 102 into a baseband digital signal, and outputs the result to demodulator 104.

Demodulator 104 performs demodulation processing upon the received baseband signal including despreading, RAKE combining, and error correction decoding, and outputs the result to divider 105. Divider 105 divides the output signal from demodulator 104 into the data and the control signal.

The control signal separated in divider 105 includes a DL (Down Link)-TPC command, CQI signal, pilot signal, ACK/NACK signal, and so on. The CQI signal and the ACK/NACK signal are output to scheduler 151. The DL-TPC command is output to transmission power controller 158.

SIR measurer 106 measures the received SIR of the uplink channel from the desired signal level and the interference signal level measured during the modulation process, and outputs a signal representing the SIR to TPC command generator 107.

TPC command generator 107 generates an UL (Up Link)-TPC command that instructs to increase or decrease the transmission power of the uplink channel according to the relationship between the received SIR of the uplink channel and the target SIR in terms of scale.

Incidentally, demodulator 104, divider 105, SIR measurer 106, and TPC command generator 107 are all provided in the same number as the communication terminal apparatuses engaged in wireless communication.

Scheduler 151 is a feature of the present invention which determines the communication terminal apparatus to transmit packets to (hereinafter referred to as "transmission destination apparatus") based on the packet transport control signals, the CQI signals and the ACK/NACK signals from the communication terminal apparatuses and outputs information representing the transmission destination apparatus and the transmitting packet data to buffer (Queue) 152.

Scheduler 151 determines the TBS (Transport Block Size), the number of codes, and the modulation scheme based on the CQI signal and pilot signal from the transmission destination apparatus, and gives instructions to modulator 153. As for the TBS, scheduler 151 sends the instructions to buffer 152 as well.

Furthermore, scheduler 151 determines the transmission power of the packet data based on the CQI signal from the transmission destination apparatus, and outputs a signal representing the transmission power to transmission power controller 154.

In addition, scheduler 151 outputs to amplifier 161 a signal (hereinafter referred to as "HS-SCCH signal") to be transmitted to the transmission destination apparatus through an HS-SCCH (Shared Control Channel of the HS-PDSCH). The HS-SCCH signal contains information (TFRI) that represents the timing to transmit the packet data, the code rate and modulation scheme for the packet data, and so on. Incidentally, the internal configuration of scheduler 151 will be described later in detail.

Buffer 152 outputs the packet data corresponding to the TBS for the transmission destination apparatus specified by scheduler 151 to modulator 153.

Modulator 153 performs the error correction coding, modulation, and despreading of the packet data in accordance with instructions from scheduler 151, and outputs the result to amplifier 155.

Transmission power controller 154 controls the amplification level in amplifier 155 and thereby controls the transmission power of the output signal of modulator 153 to be the level determined by scheduler 151. The output signal of amplifier 155 is a signal to be transmitted by the HS-PDSCH and is output to multiplexer (MUX) 165.

Multiplexer (MUX) 156, provided in the same number as the communication terminal apparatuses engaged in wireless communication, multiplexes the dedicated data (including the control signal) to be transmitted to the communication terminal apparatuses with a pilot signal and a UL-TPC command and outputs the result to modulator 157.

Modulator 157 performs the error correction coding, modulation, and spreading of the output signal of multiplexer 156 and outputs the result to amplifier 159.

Transmission power controller 158 controls the amplification level in amplifier 159 in accordance with the DL-TPC command, and thereby controls the transmission power of the output signal of modulator 157. In addition, transmission power controller 158 outputs a signal representing the transmission power level to transmission power controller 160. The signal amplified in amplifier 159 is a signal to be transmitted by a DPCH (Dedicated Physical Channel, including an A-DPCH) and is output to multiplexer 165.

Incidentally, multiplexer 156, modulator 157, transmission power controller 158, and amplifier 159 are all provided in the same number as the communication terminal apparatuses engaged in wireless communication.

Transmission power controller 160 controls the amplification level in amplifier 161 with the value of the transmission power level in transmission power controller 158 with an addition of an offset, and thereby controls the transmission power of the HS-SCCH signal output from scheduler 151. The signal amplified in amplifier 161 is a signal to be transmitted by the HS-SCCH, and is output to multiplexer 165. Transmission power controller 160 can correct the offset level according to the retransmission condition and the like.

Modulator 162 performs the error correction coding, modulation, and spreading of the shared control data, and outputs the result to amplifier 164. Transmission power controller 163 controls the amplification level in amplifier 164 and thereby controls the transmission power of the output signal from modulator 162. The output signal of amplifier 164 is a signal to be transmitted by a CPICH and is output to multiplexer 165.

Multiplexer 165 multiplexes the output signals of amplifier 155, amplifier 159, amplifier 161 and amplifier 164, and outputs the result to RF transmitter 166.

RF transmitter 166 converts the baseband digital signal output form modulator 159 into a radio frequency signal and outputs the result to duplexer 102.

Figure 4:
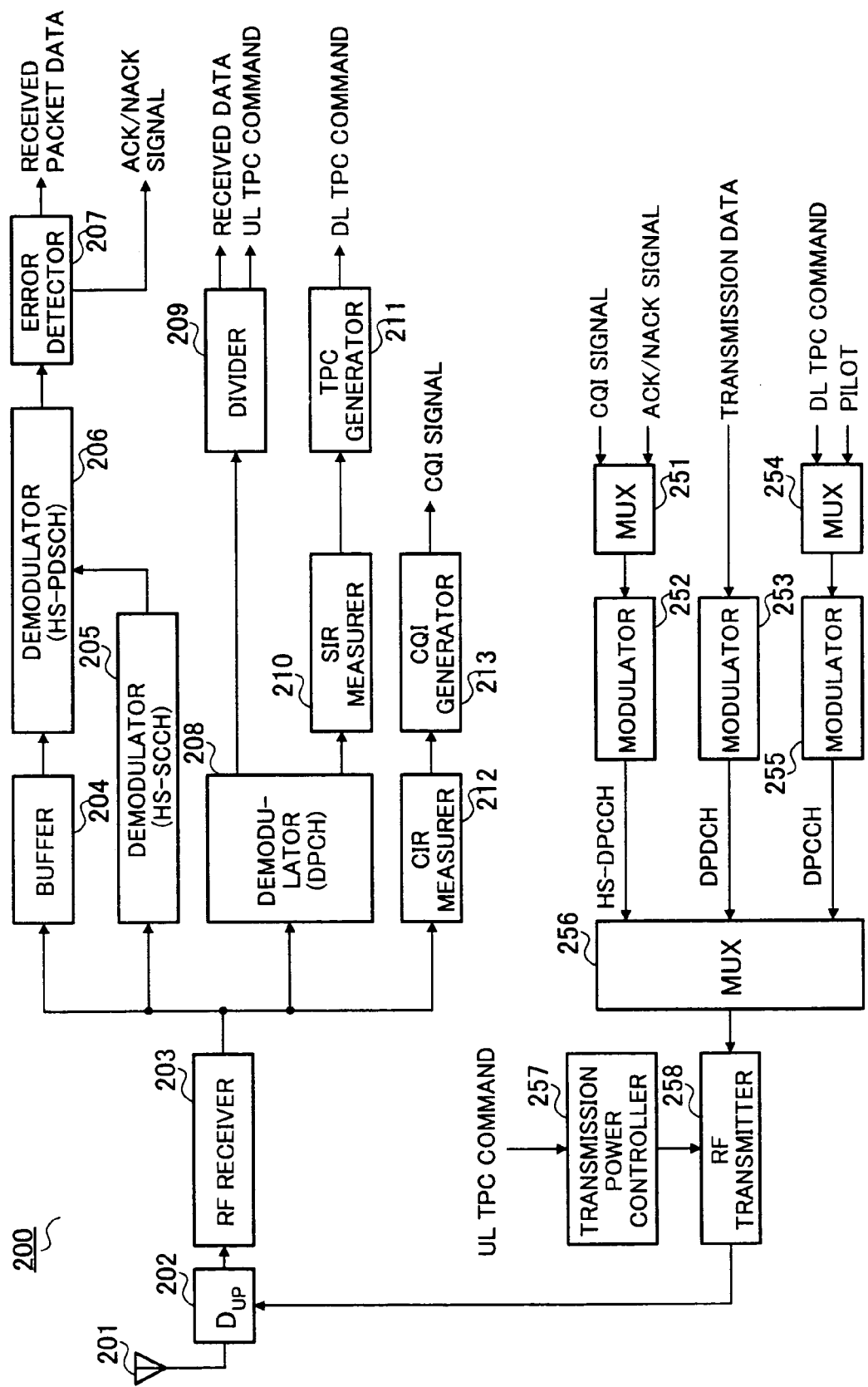
FIG. 4 is a block diagram showing a configuration of a communication terminal apparatus that communicates by radio with the base station apparatus according to Embodiment 1 of the present invention.

FIG. 4 is a block diagram showing the configuration of communication terminal apparatus 200 that performs wireless communication with base station apparatus 100 shown in FIG. 3. Communication terminal apparatus 200 of FIG. 4 receives the dedicated data, shared control data, packet data, and the HS-SCCH signal from base station apparatus 100. Now, the function of each component in base station apparatus 200 of FIG. 4 will be explained below.

Duplexer ($D_{UP}$) 202 outputs a signal received by antenna 201 to RF receiver 203. In addition, duplexer 202 transmits a signal output from RF transmitter 258 by radio from antenna 201.

RF receiver 203 converts the received signal of radio frequency output from duplexer 202 into a baseband digital signal, outputs an HS-PDSCH signal to buffer 204, outputs an HS-SCCH signal to demodulator 205, outputs a DPCH signal to demodulator 208, and outputs a shared control channel signal to CIR (Carrier to Interference Ratio) measurer 212.

Buffer 204 saves the HS-PDSCH signal on a temporary basis and outputs it to demodulator 206.

Demodulator 205 performs demodulation processing upon the HS-SCCH signal, including despreading, RAKE combining, and error correction decoding, and acquires information necessary to demodulate the packet data including the arrival timing of the packet data at the local apparatus, and the number of codes and modulation scheme of the packet data, and outputs this information to demodulator 206.

Demodulator 206 performs demodulation processing upon the HS-PDSCH signal saved in the buffer based on the information acquired in demodulator 205 based on the information obtained by demodulator 205, including despreading, RAKE combining, and error correction decoding, and outputs the packet data obtained through the demodulation processing to error detector 207.

Error detector 207 performs the error detection of the packet data output from demodulator 206, and outputs an ACK signal when no error is detected and a NACK signal when an error is detected, to multiplexer (MUX) 251.

Demodulator 208 performs demodulation processing on the DPCH signal including despreading, RAKE combining, and error correction decoding, and outputs the result to divider 209.

Divider 209 divides the output signal from demodulator 208 into the control signal and the data. The control signal separated in divider 209 includes a UL-TPC command. The UL-TPC command is output to transmission power controller 257.

SIR measurer 210 measures the received SIR's of the downlink channel from the desired signal level and the interference signal level measured during the modulation process, and outputs all the measured SIR's to TPC command generator 211.

TPC command generator 211 generates a DL-TPC command according to the relationship between the received SIR output from SIR measurer 210 and the target SIR in terms of scale, and outputs it to multiplexer (MUX) 254.

CIR measurer 212 measures the CIR using the shared control channel signal from the base station apparatus, and outputs the measurement result to CQI generator 213. CQI generator 213 generates and outputs to multiplexer 251 a CQI signal based on the CIR of the signal transmitted from the base station apparatus.

Multiplexer 251 multiplexes the CQI signal and the ACK/NACK signal, and outputs the result to modulator 252. Modulator 252 performs the error correction coding, modulation, and spreading of the output signal of multiplexer 251, and outputs the result to multiplexer (MUX) 256.

Modulator 253 performs the error correction coding, modulation and spreading of the data to be transmitted to base station apparatus 100, and outputs the result to multiplexer 256.

Multiplexer 254 multiplexes the DL-TPC command and the pilot signal, and outputs the result to modulator 255. Modulator 255 performs the error correction coding, modulation and spreading of the output signal of multiplexer 254, and outputs the result to multiplexer 256.

Multiplexer 256 multiplexes the output signals from modulator 252, modulator 253, and modulator 255, and outputs the result to RF transmitter 258.

Transmission power controller 257 controls the amplification level in RF transmitter 258 in accordance with the UL-TPC command, and thereby controls the transmission power of the output signal of multiplexer 256. When connection is established with a plurality of base station apparatuses, transmission power controller 257 performs control to increase transmission power only when all UL-TPC commands instruct to increase the transmission power.

RF transmitter 258 amplifies the baseband digital signal output from multiplexer 256, and converts the result into a radio frequency signal and then outputs the result to duplexer 202.

Next, the internal configuration of scheduler 151 of base station apparatus 100 will be described with reference to FIG. 5.

From the packet transport control signal, transmission destination determiner 301 selects the communication terminal apparatuses to be candidates to transmit packets to, and determines the transmission destination apparatus based on the CQI signals from these selected communication terminals apparatuses. For example, based on the CQI signals, the communication terminal apparatus having the best received quality is selected as the transmission destination apparatus. Transmission destination determiner 301 outputs information that indicates the transmission destination apparatus to buffer 152, HS-PDSCH SIR estimator 303, MCS determiner 304, and HS-SCCH signal generator 305.

Transmission destination determiner 301 instructs buffer 152 to transmit new data when an ACK signal is input, and to retransmit the previously transmitted data when a NACK signal is input.

Transmission power determiner 302 manages the transmission power resources and determines the transmission power of the HS-PDSCH and the transmission power of the pilot channel. Then, transmission power determiner 302 outputs a signal that represents the determined transmission power to HS-PDSCH SIR estimator 303 and transmission power controllers 154 and 163.

HS-PDSCH SIR estimator 303 estimates the SIR of the HS-PDSCH as the signal quality at the transmission destination apparatus based on the CQI signal and transmission power, and reports the result to MCS determiner 304. To be more specific, the estimation of the HS-PDSCH SIR is performed from the transmission power of the HS-PDSCH ($P_{HS-PDSCH}$) the transmission power of the pilot channel ($P_{CPICH}$) determined based on the transmission power resources, and the offset $\Gamma$, according to following formula (3):

$$HS-PDSCH\ SIR\ [dB] = -4.5 + CQI + \{P_{HS-PDSCH} - (P_{CPICH} + \Gamma)\} \quad (3)$$

MCS determiner 304 determines the TBS based on the HS-PDSCH SIR, and thereafter performs MCS selection (i.e., determination of the number of codes and the modulation scheme) for the transmission destination apparatus, and output the MCS to HS-SCCH signal generator 305 and gives instructions to modulator 153. As for the TBS, instructions are given to buffer 152.

HS-SCCH signal generator 305 generates an HS-SCCH signal for the transmission destination apparatus based on the MCS output from MCS determiner 304 and outputs this signal to amplifier 161.

Now, the details of MCS determiner 304 will be explained. FIG. 6 is a schematic view of a TBS table in MCS determiner 304. HS-PDSCH SIR is shown every one [dB] between −3.5 [dB] and 25.5 [dB] in 30 stages, each assigned a TBS corresponding to one of the numbers of codes between 1 and 15.

This table is provided per modulation scheme, and, in FIG. 6, it is provided for QPSK and 16QAM each. The TBS assigned to this table is the maximum transmissible TBS to satisfy the quality requirement (for example, FER=0.1).

Figure 7:
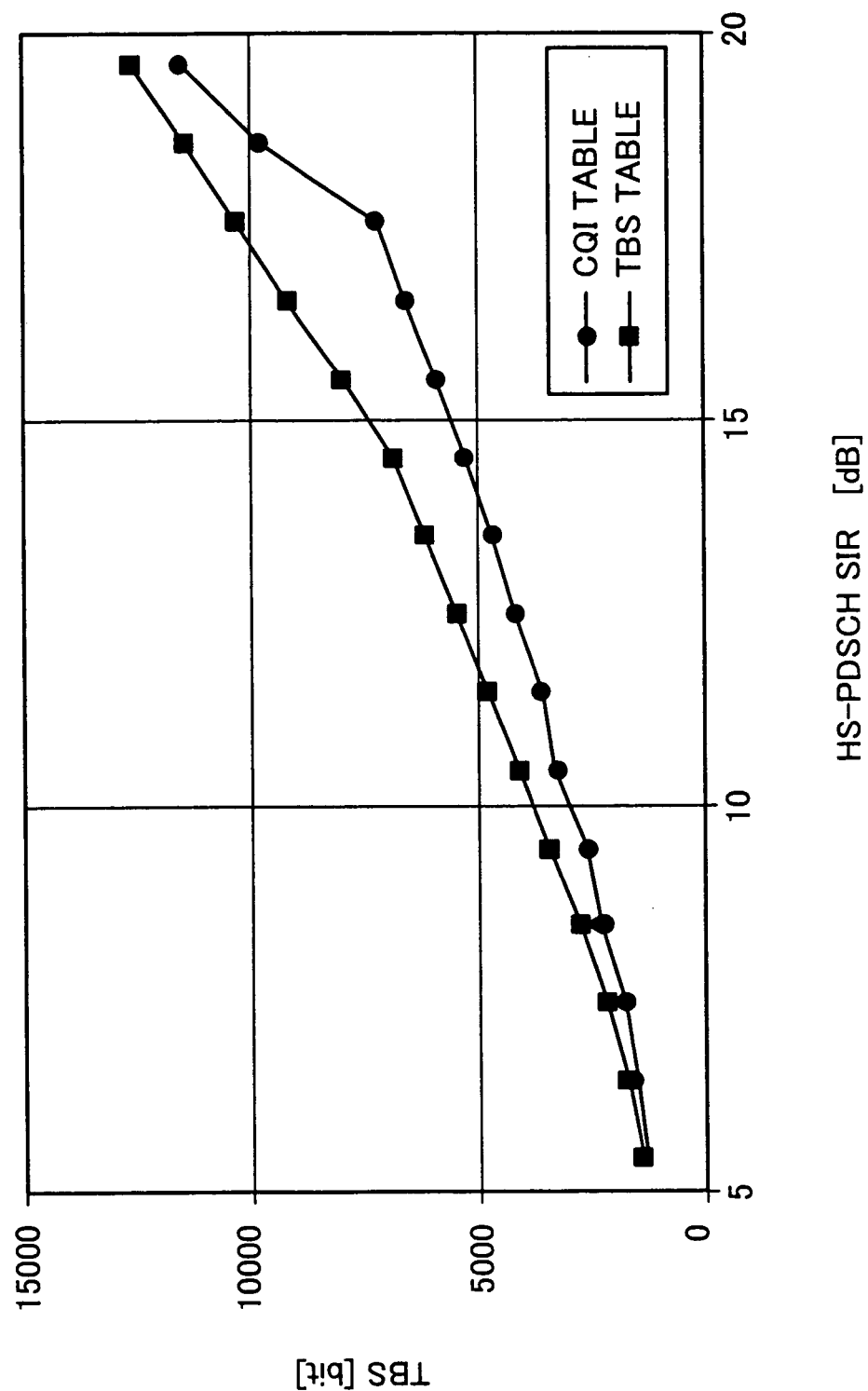
FIG. 7 shows a comparison of a conventional CQI table and the TBS table according to Embodiment 1.

FIG. 7 shows a comparison of a conventional CQI table and the above-described TBS table. The figure presents a graph in which the vertical axis represents the TBS [bit] and the horizontal axis represents the HS-PDSCH SIR [dB]. The broken line connecting the plots of circles represents the conventional CQI table and the broken line connecting the plots of squares represents the TBS table of this embodiment. The TBS of this embodiment is optimized by the combination of the number of codes and modulation scheme.

According to this figure, at any SIR, the TBS table is capable of sending a greater TBS than by the CQI table, so that an increase in the throughput is obvious. In practice, the TBS table of FIG. 6 is as shown in FIG. 8A and FIG. 8B.

FIG. 8A shows a table representing specific TBS values where turbo code having the code rate of ⅓ is employed. FIG. 8B shows the code rates corresponding to the TBS's of FIG. 8A. For ease of explanation, the number of codes shown is between 1 and 5.

It is obvious from FIG. 8A and FIG. 8B that the individual numbers of codes correspond to a certain range of the HS-PDSCH SIR. For example, in FIG. 8B, nearly all code rates are above ⅓ and below 1. When the code rate falls below ⅓, the redundancy after coding becomes greater. That is, in order to perform rate matching, the same coded bit is mapped on multiple symbols on the physical channel by repetition, and this will result in reduced efficiency.

"Below ⅓" applies only when QPSK is employed such that the number of bits on the physical channel becomes minimum, that is, one code. This is because when the HS-PDSCH SIR is very low, the environment is susceptible to errors, and it becomes necessary to reduce the code rate and heighten the redundancy. Consequently, the TBS needs to be made small. On the other hand, the code rate is below 1 because all of systematic bits of turbo code are always transmitted.

In FIG. 8A, looking at a certain number of codes of a certain modulation scheme, it is possible to make the TBS greater in proportion to the HS-PDSCH SIR. Likewise, looking at a certain modulation scheme of a certain HS-PDSCH SIR, it is possible to make the TBS greater in proportion to the number of codes.

In addition, a comparison of combinations having the same number of bits on the physical channel with regard to a certain HS-PDSCH SIR (for instance, two codes in QPSK and one code in 16QAM) shows that QPSK is able to make the TBS greater, because QPSK is more resistant to errors. In such case, when there are enough code resources, it is possible to use QPSK of a low m-ary number.

Figure 9:
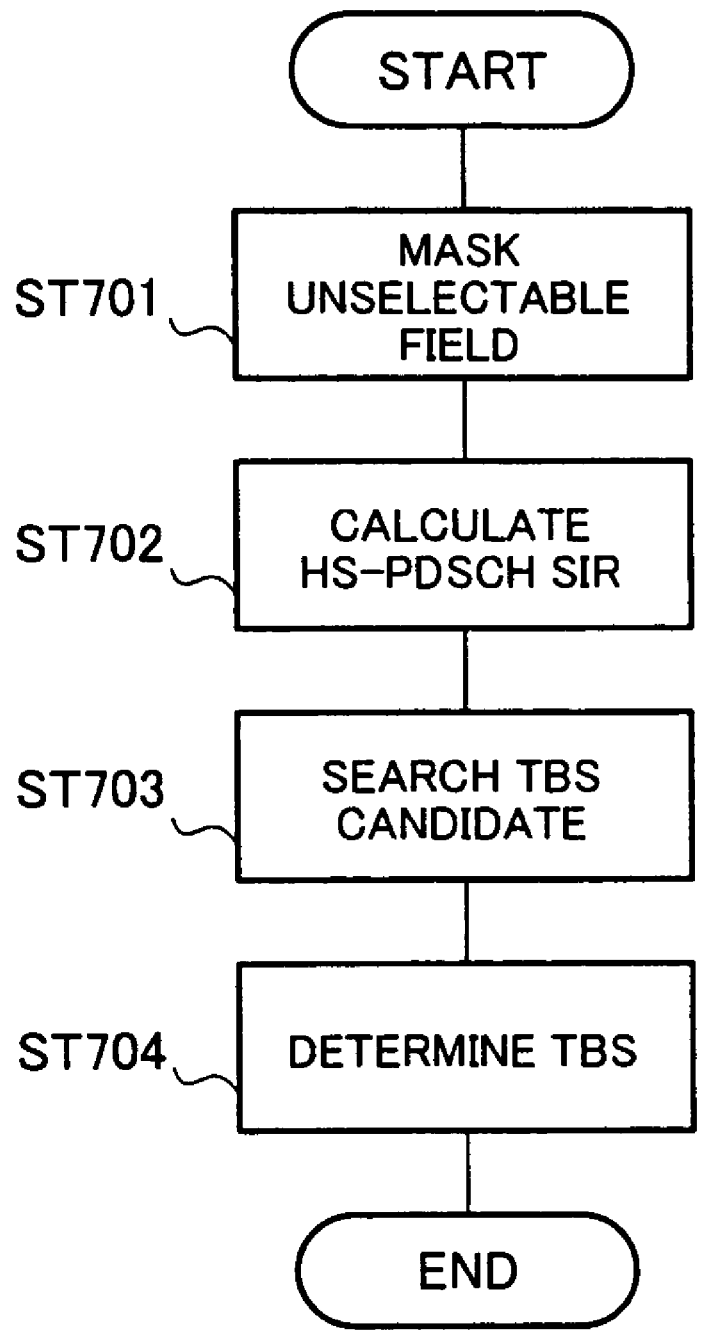
FIG. 9 is a flow chart showing the steps of determining the MCS using the TBS table in the MCS determiner in the base station apparatus according to Embodiment 1 of the present invention.

Next, the process of determining the MCS using the TBS table in MCS determiner 304 will be explained with reference to FIG. 9. Referring to FIG. 9, in step (hereinafter "ST") 701, based on the capability of the communication terminal apparatus and the number of codes the base station apparatus is able to assign, the unselectable combinations of the number of codes and modulation scheme are masked. By this means, it is possible to have fewer combinations of the modulation scheme and the number of codes, so that the time spent for the below-described TBS selection can be shortened. When there is no unselectable combination, the masking will not apply, and the process proceeds to ST702.

In ST702, an estimate value of the HS-PDSCH SIR upon reception by the communication terminal apparatus is calculated from the CQI, the transmission power of the HS-PDSCH, the transmission power of the pilot channel, determined based on transmission power resources, and the offset r.

In ST703, based on the estimated HS-PDSCH SIR, the maximum TBS is searched from the selectable combinations of the number of codes and modulation scheme, and the searched TBS is made a candidate.

In ST704, the number of codes and modulation scheme that matches the TBS selected in ST703 are determined, and thereupon the MCS determination process ends.

Thus, according to this embodiment, a TBS table is provided in which all combinations of the number of codes and modulation scheme are provided based on the SIR of the HS-PDSCH in consideration of transmission power resources, and the TBS is determined based on the SIR of the HS-PDSCH at the communication terminal apparatus upon reception, so that it is possible to optimize the TBS and improve throughput.

Although this embodiment has been described with reference to a TBS table, it is equally possible to use formulas as long as the TBS is determined.

EMBODIMENT 2

Although the first embodiment has been described using the same TBS table for initial transmission and retransmission without distinguishing between them, the present embodiment will be described with reference to a TBS table that takes retransmission, IR-scheme retransmission in particular, into consideration.

FIG. 10A is a table with specific TBS values. FIG. 10B shows code rates corresponding to the TBS. For ease of explanation, the number of codes shown is between 1 and 5. In FIG. 10B, most of the code rates are above 0.6 and below 1, and, in comparison to the code rates of FIG. 8, the code rates are limited.

Figure 11:
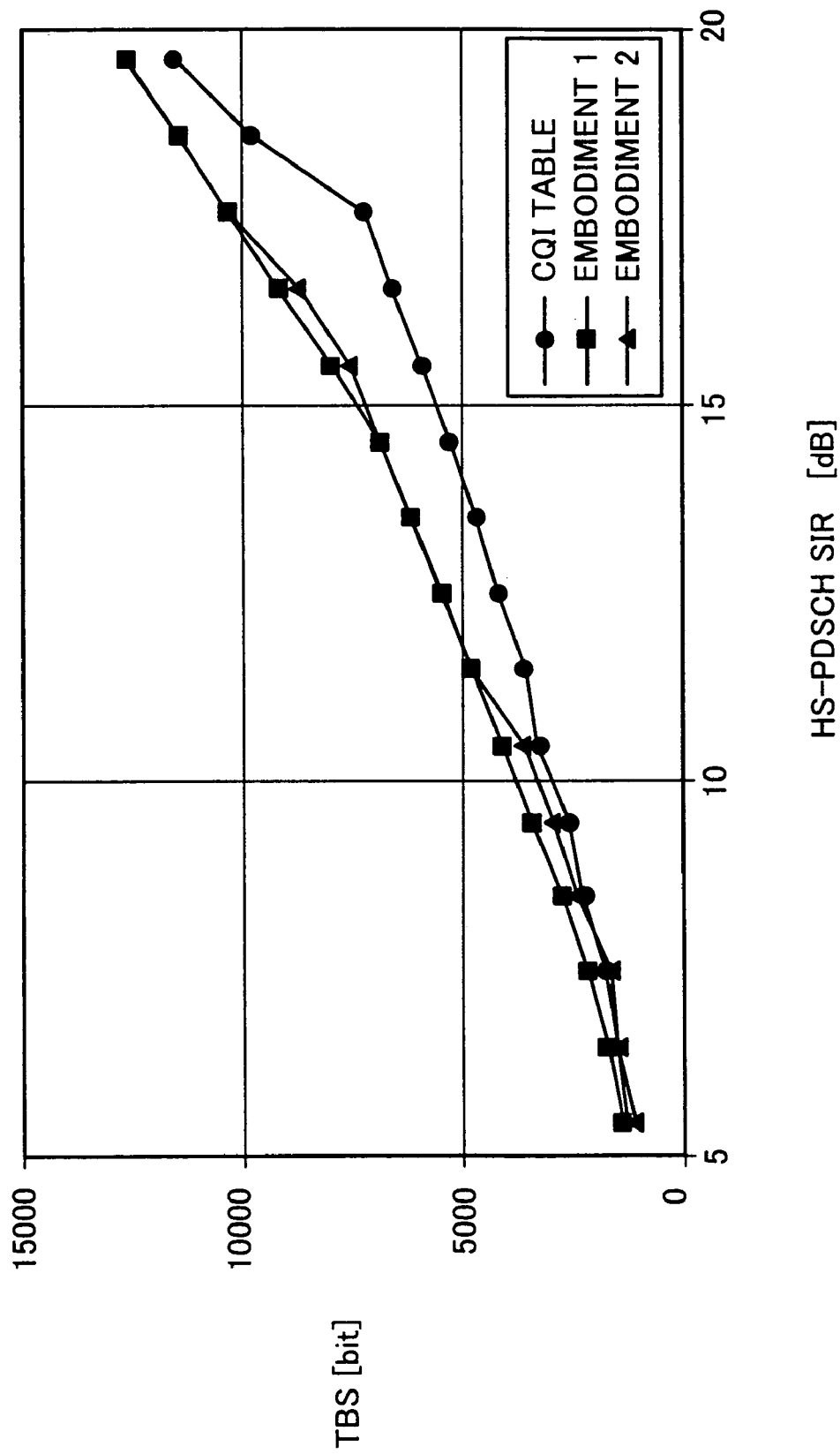
FIG. 11 shows a comparison of a conventional CQI table and a TBS table according to Embodiment 2.

FIG. 11 shows a comparison of a conventional CQI table and the above-described TBS table. The figure presents a graph in which the vertical axis represents the TBS [bit] and the horizontal axis represents the HS-PDSCH SIR [dB]. The broken line connecting the plots of circles represents the conventional CQI table and the broken line connecting the plots of triangles represents the TBS table of this embodiment.

In addition, the broken line connecting the plots of squares represents the TBS table of Embodiment 1.

The TBS of this embodiment is optimized by the combination of the number of codes and modulation scheme.

In this figure, where the HS-PDSCH SIR, is low, there is little difference from conventional system. However, from near 10 [dB], it becomes possible to transmit a greater TBS than conventional system and perform transmission in a practically equal TBS to Embodiment 1.

The TBS table of the present embodiment is suitable for performing retransmission including untransmitted coded bits that are all or partially different than the initial transmission, and this will be described with reference to FIG. 12.

Figure 12:
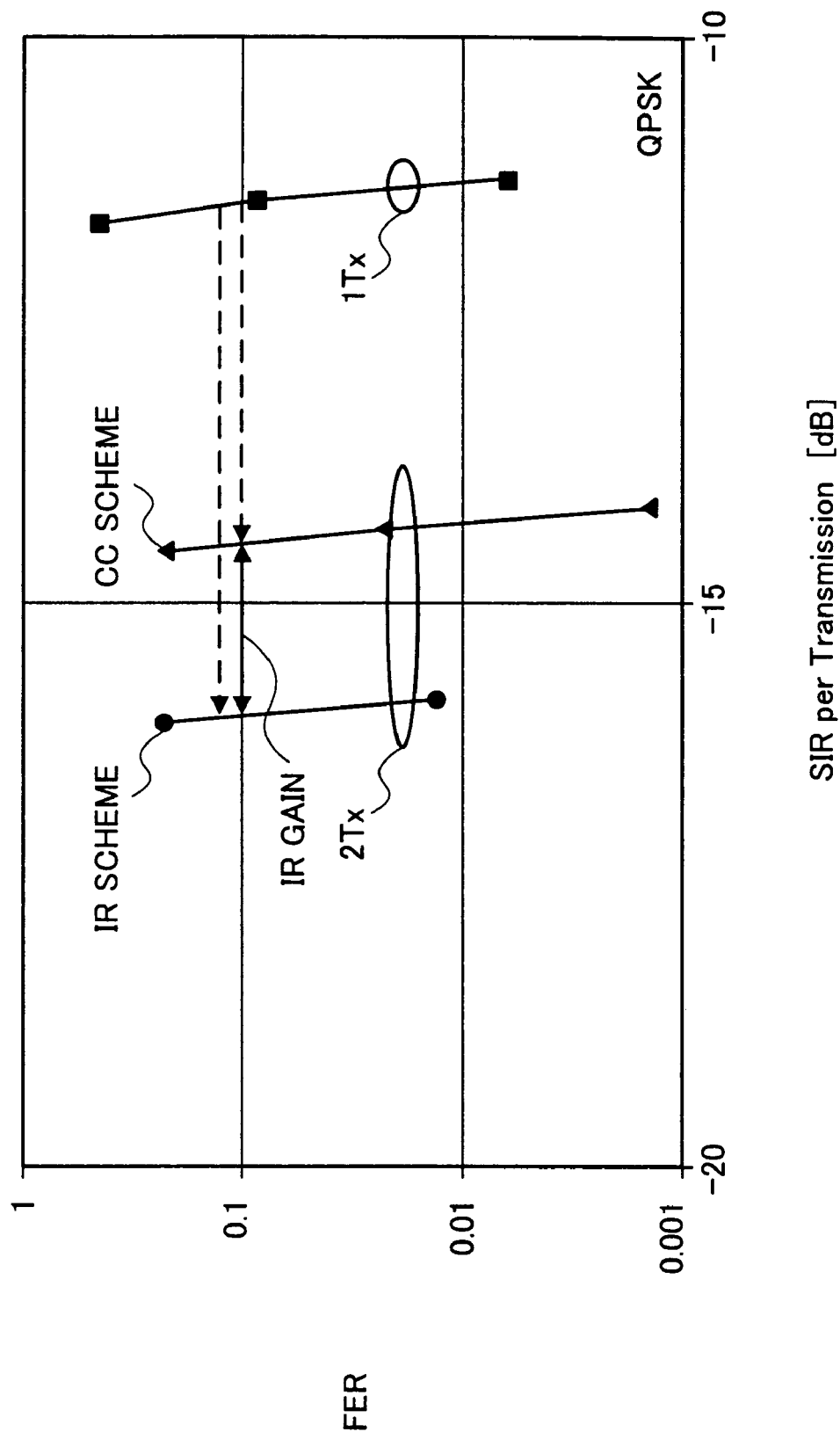
FIG. 12 shows the relationship of the SIR and FER required per transmission.

FIG. 12 shows the relationship of the SIR and FER required per transmission. In this figure, the vertical axis represents the FER and the horizontal axis represents the SIR required per transmission. In addition, the line connecting the plots of squares represents the case where QPSK transmission is performed once (1Tx); the line connecting the plots of triangles represents the case where CC scheme transmission is performed twice (2Tx); and the line connecting the plots of circles represents the case where IR scheme transmission is performed twice (2Tx). When transmission is performed twice, both the CC scheme and the IR scheme reduce the SIR required per transmission. However, in comparison to the CC scheme, the IR scheme enables transmission at still lower SIR, and this difference is the gain of the IR scheme (IR gain).

Thus, the code rate is made greater than 0.6, and the parity bits that can be transmitted upon initial transmission are limited, and so the remaining parity bits are transmitted upon retransmission. In the IR scheme, the parity bits received earlier at the communication terminal apparatus of the receiving end and the parity bits transmitted upon retransmission are combined to decode the systematic bit. Consequently, the code rate decreases every time the count of retransmission increases, thereby maintaining the gain of the IR scheme. In other words, it is possible to decrease the count of retransmission until a certain quality level can be reduced.

Although in FIG. 12 the count of transmission is shown to be only two, the count can be 3 or greater, and the gain of the IR scheme increases in inverse proportion to the increase of the count of retransmission and decrease of the code rate.

In this embodiment, the upper limit of the TBS is determined in consideration of the amount of memory the communication terminal apparatus uses in H-ARQ.

Thus, according to the present embodiment, the TBS used in the TBS table is made greater than a certain code rate, so that it is possible to reduce the SIR required per transmission by the IR scheme that performs transmission at a different code rate upon every retransmission.

Although a case has been described with the present embodiment where the code rate is greater than 0.6, the present invention is by no means limited to this, and the code rate needs only to be adjusted to an adequate level above the code rate of the coder. For example, the code rate may be adjusted to an adequate level in accordance with the modulation scheme. Considering the case of 16 QAM, which is more susceptible to errors than QPSK, by making the adequate level greater than in the case of QPSK, 16QAM that is susceptible to errors can fulfill the received quality level at a lower count of retransmission if the IR retransmission scheme is employed. As a result, it is possible to improve the throughput.

EMBODIMENT 3

A case will be described here with this embodiment where the TBS is adjusted in consideration of the amount of data awaiting transmission in a buffer (Queue).

Figure 13:
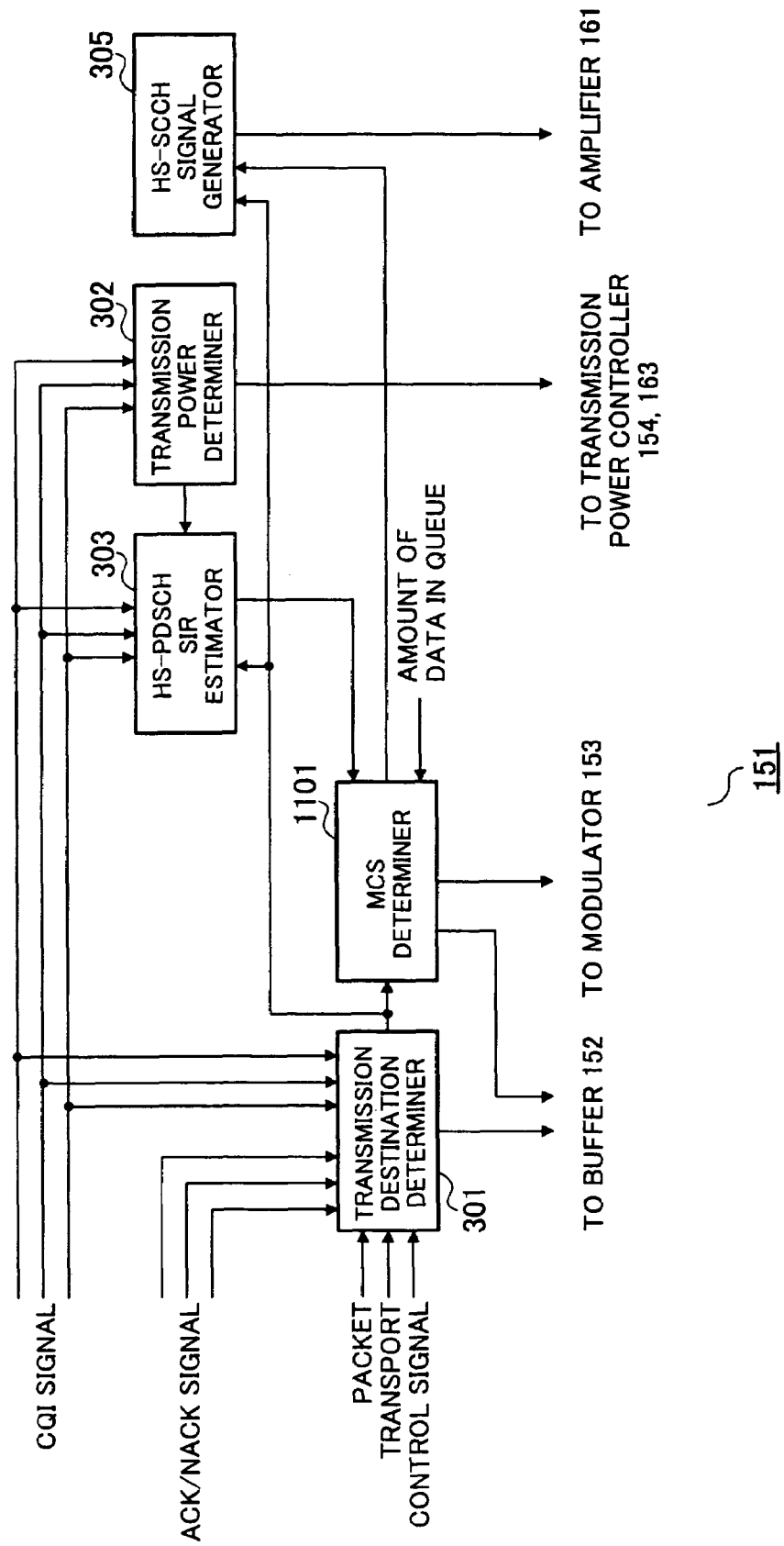
FIG. 13 is a block diagram showing an internal configuration of a scheduler according to Embodiment 3 and Embodiment 5.

FIG. 13 is a block diagram showing the internal configuration of the scheduler according to Embodiment 3 of the present invention.

Figure 5:
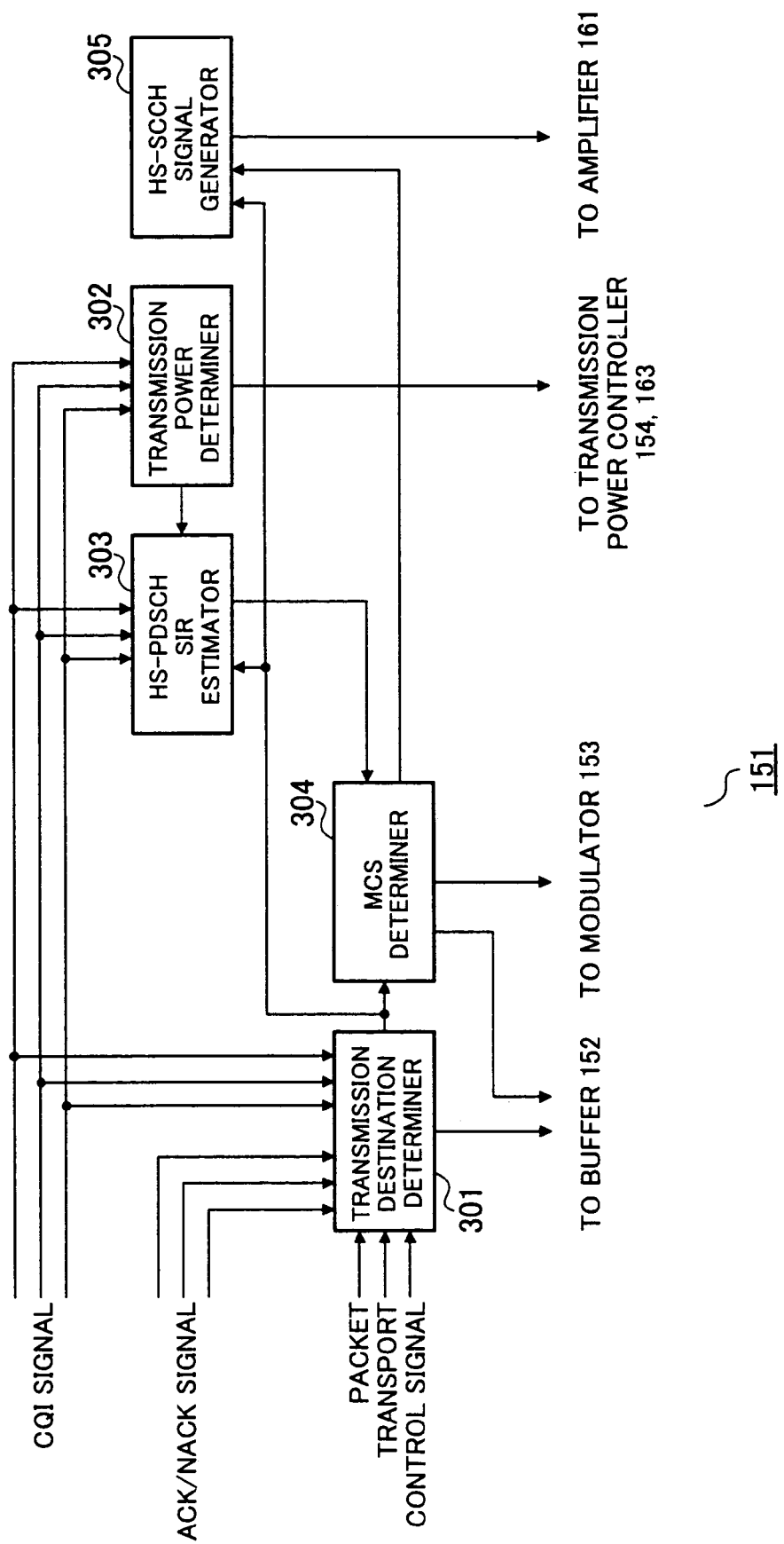
FIG. 5 is a block diagram showing an internal configuration of a scheduler in the base station apparatus according to Embodiment 1 of the present invention.

Parts in FIG. 13 that are identical to the ones in FIG. 5 are assigned the same numerals as in FIG. 5 without further explanations.

The difference between FIG. 13 and FIG. 5 is that MCS determiner 304 is replaced by MCS determiner 1101.

Buffer 152 counts the amount of data awaiting transmission (referred to as "the amount of data in queue") and reports the result to MCS determiner 1101.

MCS determiner 1101 performs control such that the TBS does not exceed the amount of transmission data by more than a certain range in consideration of the amount of data in queue. For example, when the HS-PDSCH SIR is good and a TBS candidate is determined that exceeds the amount of data in queue by more than a certain range, it is necessary to perform padding processing to fill the blank field, and yet this processing may as well not be performed. In addition, it is possible to avoid resource consumption.

Figure 14:
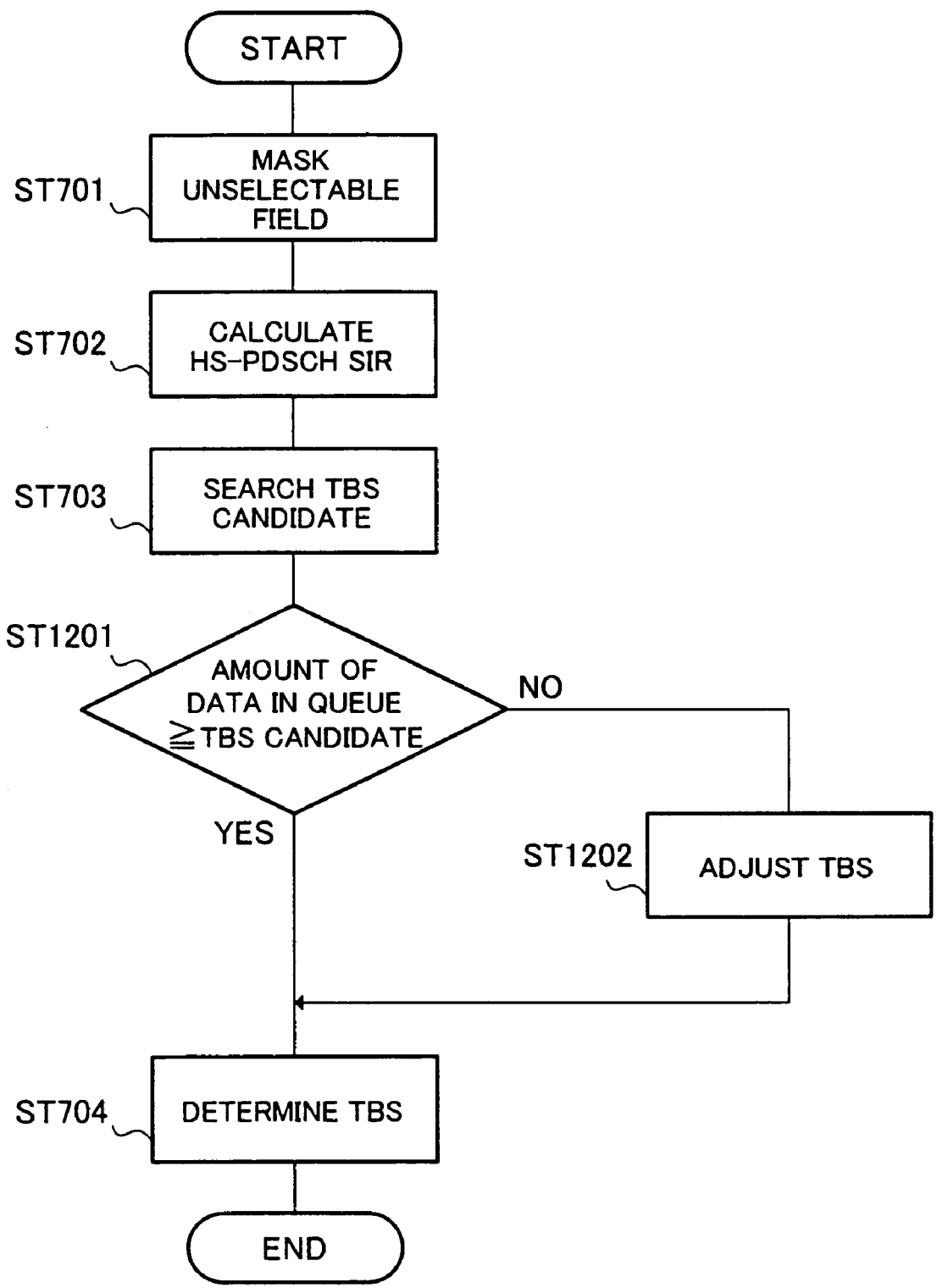
FIG. 14 is a flow chart showing the steps of determining MCS using a TBS table in an MCS determiner according to Embodiment 3 of the present invention.

Next, the steps of determining the MCS using the TBS table in MCS determiner 1101 will be described with reference to FIG. 14. Parts in FIG. 14 that are identical to those of FIG. 9 will be assigned the same numerals as in FIG. 9 without further explanations. In ST1201, a scale comparison is drawn between the amount of data in queue reported from buffer 152 and the candidate TBS searched in ST703. That is, determination is made as to whether or not the amount of data in queue is greater than the candidate TBS. When the amount of data in queue is greater than the candidate TBS, the process moves onto ST704. When the amount of data in queue is not greater than the candidate TBS, the process moves to ST1202.

In ST1202, adjustment is made to make the TBS match the amount of data in queue or to make the TBS greater than and closest to the amount of data in queue.

Thus, according to the present embodiment, it is possible to avoid resource consumption by adjusting the TBS in consideration of the amount of data in queue upon determining the MCS.

EMBODIMENT 4

Figure 15:
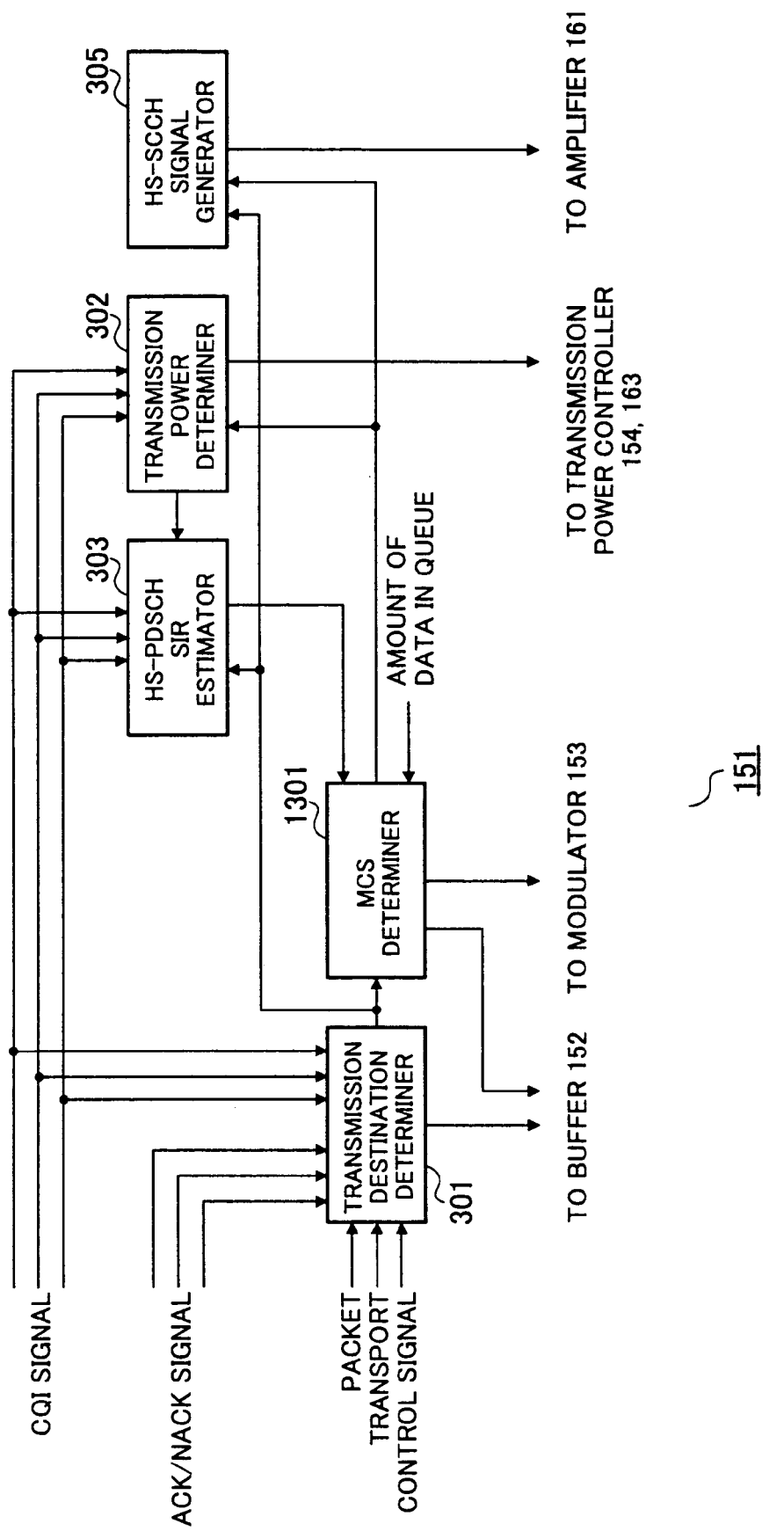
FIG. 15 is a block diagram showing an internal configuration of a scheduler according to Embodiments 4, 6 and 7 of the present invention.

FIG. 15 is a block diagram showing the internal configuration of a scheduler according to Embodiment 4 of the present invention. Parts in FIG. 15 that are identical to those of FIG. 5 will be assigned the same numerals as in FIG. 5 without further explanations. The difference between FIG. 15 and FIG. 5 is that MCS determiner 304 is replaced by MCS determiner 1301.

MCS determiner 1301 performs a scale comparison between the amount of data in queue reported from buffer 152 and the candidate TBS. When the TBS exceeds the amount of data in queue by more than a certain range, MCS determiner 1301 controls the TBS not to exceed the amount of data in queue by more than a certain range. That is, in the TBS table, the TBS is adjusted to lower the HS-PDSCH SIR. MCS determiner 1301 instructs transmission power determiner 302 to lower the transmission power in correspondence to the lowered HS-PDSCH.

Next, the steps of determining the MCS using the TBS table in MCS determiner 1301 will be described with reference to FIG. 16. Parts in FIG. 16 that are identical to those of FIG. 14 will be assigned the same numerals as in FIG. 14 without further explanations. In ST1401, in the TBS table, the TBS is lowered to reduce the HS-PDSCH SIR, and adjustment is made to make the TBS match the amount of data in queue or to make the TBS greater than and closest to the amount of data in queue.

In ST1402, the transmission power is reduced in proportion to the HS-PDSCH lowered in ST 1401. Consequently, MCS determiner 1301 instructs transmission power determiner 302 to reduce the transmission power, and the process moves onto ST704.

Thus, according to the present invention, the TBS is adjusted to reduce the HS-PDSCH SIR when the TBS searched based on the HS-PDSCH SIR exceeds the amount of data in queue by more than a certain range, and the transmission power is reduced in proportion to the HS-PDSCH SIR reduced. Consequently, it is possible to use transmission power resources efficiently.

EMBODIMENT 5

The scheduler according to Embodiment 5 of the present invention shares the same internal configuration as shown in FIG. 13, and so FIG. 13 will be used here and the steps of MCS determination in MCS determiner 1101 will be described with reference to FIG. 17. Parts in FIG. 17 that are identical to those in FIG. 14 will be assigned the same numerals as in FIG. 14 without further explanations.

Figure 17:
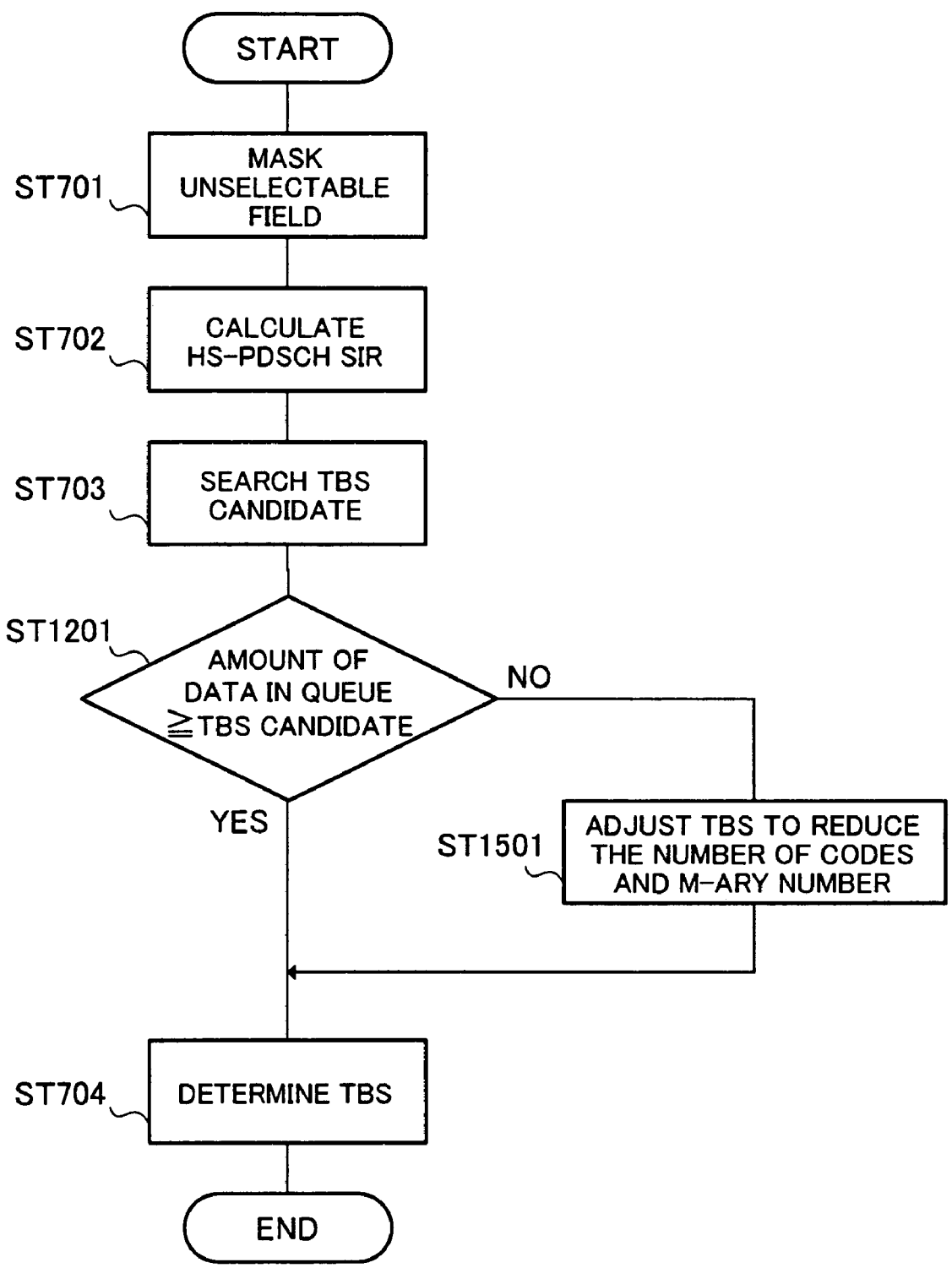
FIG. 17 is a flow chart showing the steps of determining MCS using a TBS table in an MCS determiner according to Embodiment 5 of the present invention.

Referring to FIG. 17, MCS determiner 1101 performs a scale comparison between the amount of data in queue reported from buffer 152 and the candidate TBS searched in ST703. That is, determination is made as to whether or not the amount of data in queue is greater than the candidate TBS. When the amount of data in queue is greater than the candidate TBS, the process moves onto ST704. When the amount of data in queue is not greater than the candidate TBS, the process moves to ST1501.

In ST1501, in the TBS table, the TBS is lowered to reduce the number of codes and m-ary number, and adjustment is made to make the TBS match the amount of data in queue or to make the TBS greater than and closest to the amount of data in queue. The number of codes is reduced here, which makes it possible to use code resources efficiently, assign the codes to a greater number of communication terminal apparatuses, and improve the throughput.

Moreover, the m-ary number is reduced, which makes errors less likely, and it is possible to improve the received quality at the communication terminal apparatus.

Thus, according to the present invention, the TBS is adjusted to reduce the number of codes and m-ary number when the TBS searched based on the HS-PDSCH SIR exceeds the amount of data in queue by more than a certain range. Consequently, it is possible to use code resources efficiently, improve throughput, and improve the received quality at the communication terminal apparatus.

EMBODIMENT 6

The scheduler according to Embodiment 6 of the present invention shares the same internal configuration as shown in FIG. 15, and so FIG. 15 will be used here and the steps of MCS determination in MCS determiner 1301 will be described with reference to FIG. 18. Parts in FIG. 18 that are identical to those of FIG. 16 will be assigned the same numerals as in FIG. 16 without further explanations.

Figure 18:
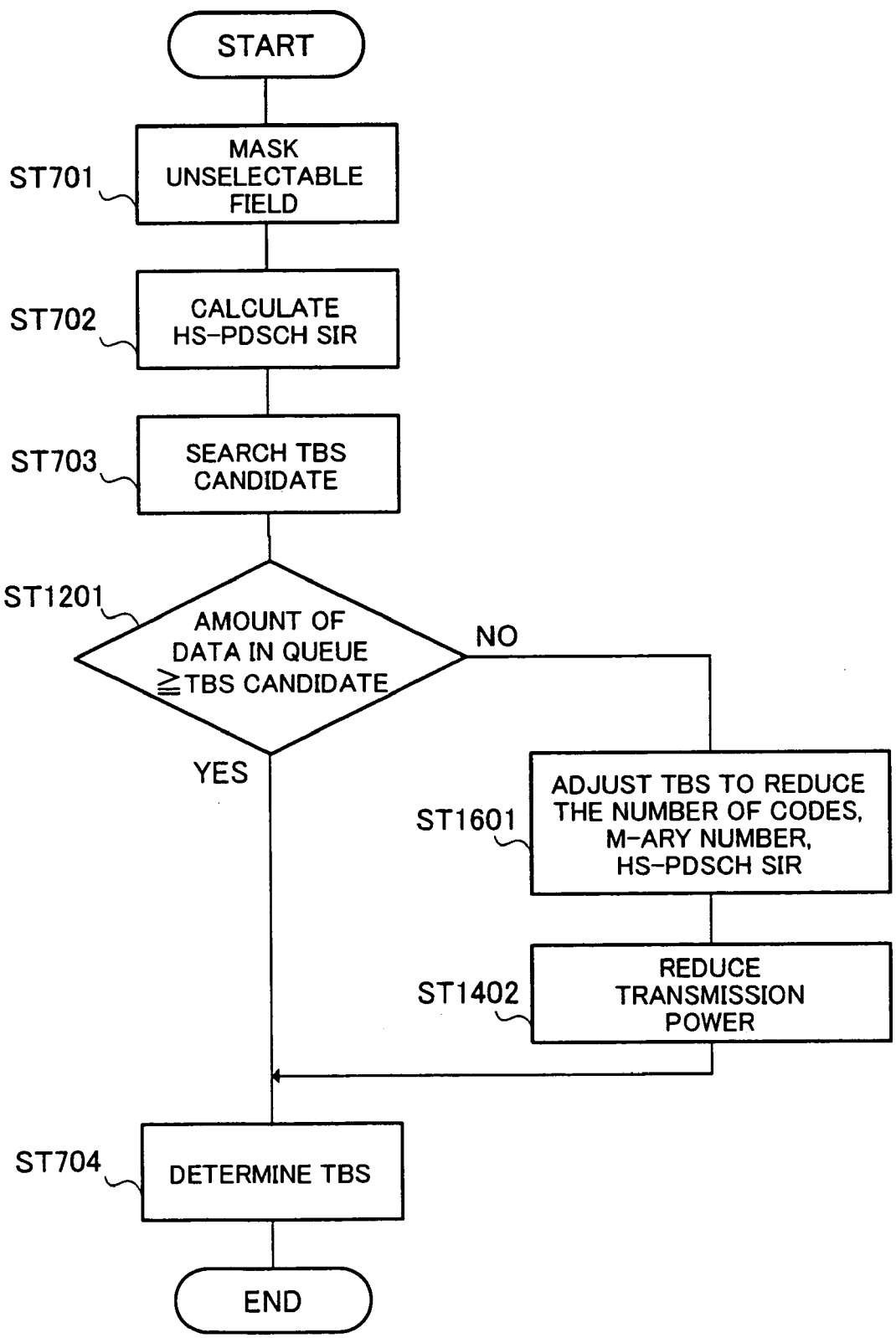
FIG. 18 is a flow chart showing the steps of determining MCS using a TBS table in an MCS determiner according to Embodiment 6 of the present invention.

Referring to FIG. 18, MCS determiner 1301 performs a scale comparison between the amount of data in queue reported from buffer 152 in ST1201 and the candidate TBS searched in ST703. That is, determination is made as to whether or not the amount of data in queue is greater than the candidate TBS. When the amount of data in queue is greater than the candidate TBS, the process moves onto ST704. When the amount of data in queue is not greater than the candidate TBS, the process moves onto ST1601.

In ST1601, in the TBS table, the TBS is lowered to reduce the HS-PDSCH SIR, the number of codes, and m-ary number, and adjustment is made to make the TBS match the amount of data in queue or to make the TBS greater than and closest to the amount of data in queue.

In ST1402, the transmission power proportionate to the HS-PDSCH SIR lowered in ST1601 is reduced. Consequently, MCS determiner 1301 instructs transmission power determiner 302 to reduce the transmission power, and the process moves onto ST704.

Thus, according to the present invention, the TBS is adjusted to reduce the HS-PDSCH SIR, the number of codes, and m-ary number, when the TBS searched based on the HS-PDSCH SIR exceeds the amount of data in queue by more than a certain range, and the transmission power is reduced in proportion to the HS-PDSCH SIR reduced. Consequently, it is possible to use transmission power resources efficiently. In addition, the efficient use of code resources makes it possible to assign codes to a greater number of communication terminal apparatuses and improve throughput.

Furthermore, the received quality at the communication terminal apparatus can be improved.

EMBODIMENT 7

The scheduler according to Embodiment 7 of the present invention shares the same internal configuration as in FIG. 15, and so FIG. 15 will be used here and the steps of MCS determination in MCS determiner 1301 will be described with reference to FIG. 19.

Figure 16:
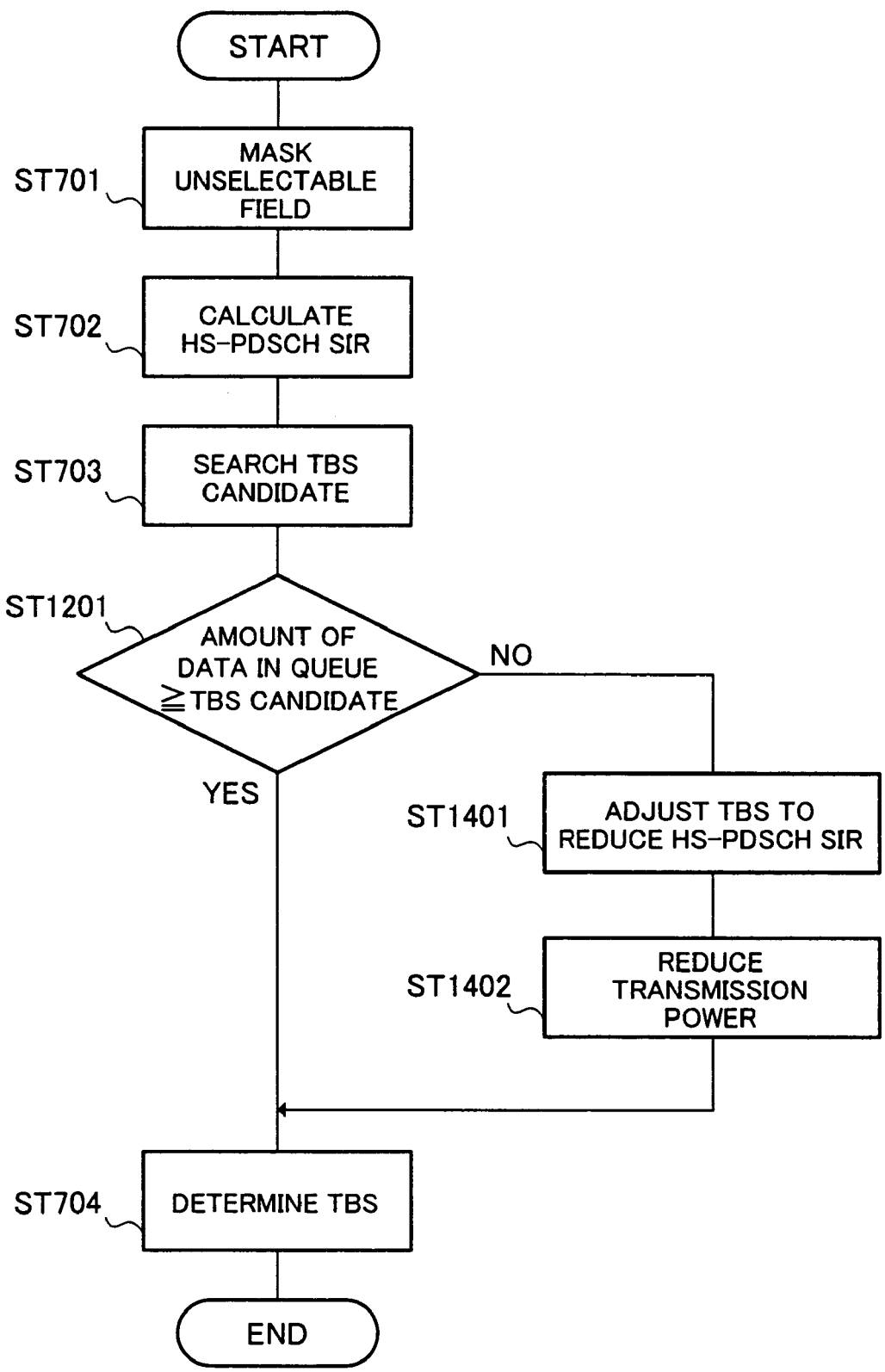
FIG. 16 is a flow chart showing the steps of determining MCS using a TBS table in an MCS determiner according to Embodiment 4 of the present invention.
Figure 19:
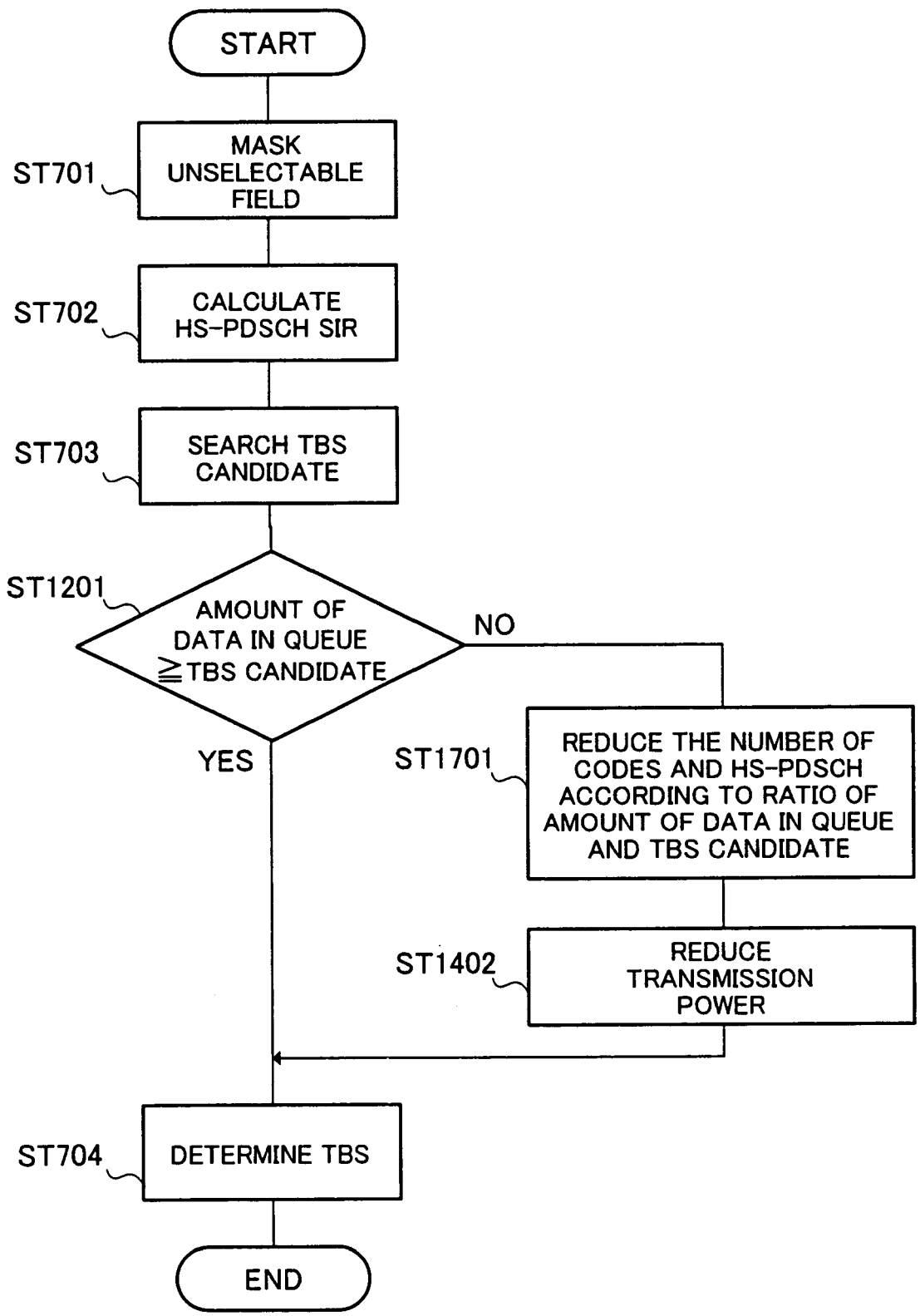
FIG. 19 is a flow chart showing the steps of determining MCS using a TBS table in an MCS determiner according to Embodiment 7 of the present invention.

Parts in FIG. 19 that are identical to the ones in FIG. 16 are assigned the same numerals as in FIG. 16 without further explanations.

Referring to FIG. 19, MCS determiner 1301 performs a scale comparison between the amount of data in queue reported from buffer 152 in ST1201 and the candidate TBS searched in ST703. That is, determination is made as to whether or not the amount of data in queue is greater than the candidate TBS. When the amount of data in queue is greater than the candidate TBS, the process moves onto ST704. When the amount of data in queue is not greater than the candidate TBS, the process moves onto ST1701.

In ST1701, the number of codes and the HS-PDSCH SIR are reduced in accordance with the ratio of the amount of data in queue to the candidate TBS searched in ST703. For example, if the ratio is 1/A, the number of codes and the HS-PDSCH are multiplied by 1/A. By this means, it is not necessary to search the TBS table again for TBS adjustment, so that the time required to determine the MCS can be shortened.

Thus, according to the present embodiment, upon MCS determination, the number of codes and the HS-PDSCH SIR are reduced in accordance with the ratio of the amount of data in queue to the TBS candidate, when the TBS searched based on the HS-PDSCH SIR exceeds the amount of data in queue by more than a certain range, so that the time required to determine the MCS can be shortened.

In addition, it is possible to use transmission power resources efficiently by reducing the transmission power proportionate to the HS-PDSCH SIR reduced.

EMBODIMENT 8

In each of the above-described embodiments, the base station apparatus determines the MCS. A case will be described now with this embodiment where the communication terminal apparatus determines the MCS.

Figure 20:
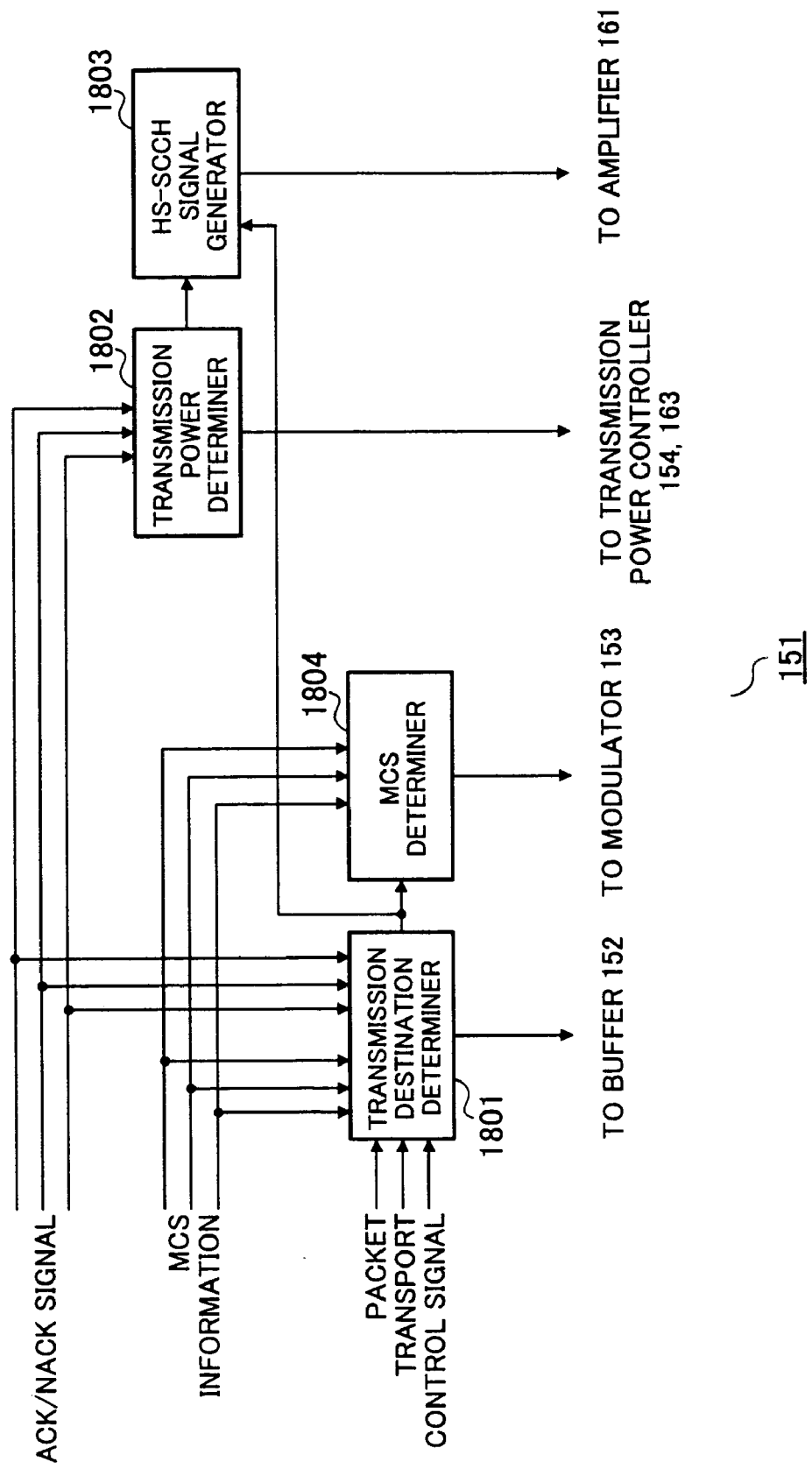
FIG. 20 is a block diagram showing an internal configuration of a scheduler in a base station apparatus according to Embodiment 8 of the present invention.

FIG. 20 is a block diagram showing the internal configuration of a scheduler in a base station apparatus according to Embodiment 8 of the present invention. Transmission destination determiner 1801 acquires information about the MCS requested by the communication terminal apparatus, selects the communication terminal apparatus of a large TBS based on the MCS information, and reports the selected transmission destination apparatus to HS-SCCH signal generator 1803 and MCS controller 1804.

Transmission power determiner 1802 determines the transmission power of the HS-PDSCH and outputs information representing the determined transmission power to HS-SCCH signal generator 1803.

HS-SCCH signal generator 1803 generates HS-SCCH signal including the HS-PDSCH transmission power information output from transmission power determiner 1802 and outputs the signal to amplifier 161.

MCS controller 1804 controls modulator 153 based on the MCS information to assign the MCS to the communication terminal apparatus determined by transmission destination determiner 1801.

Figure 21:
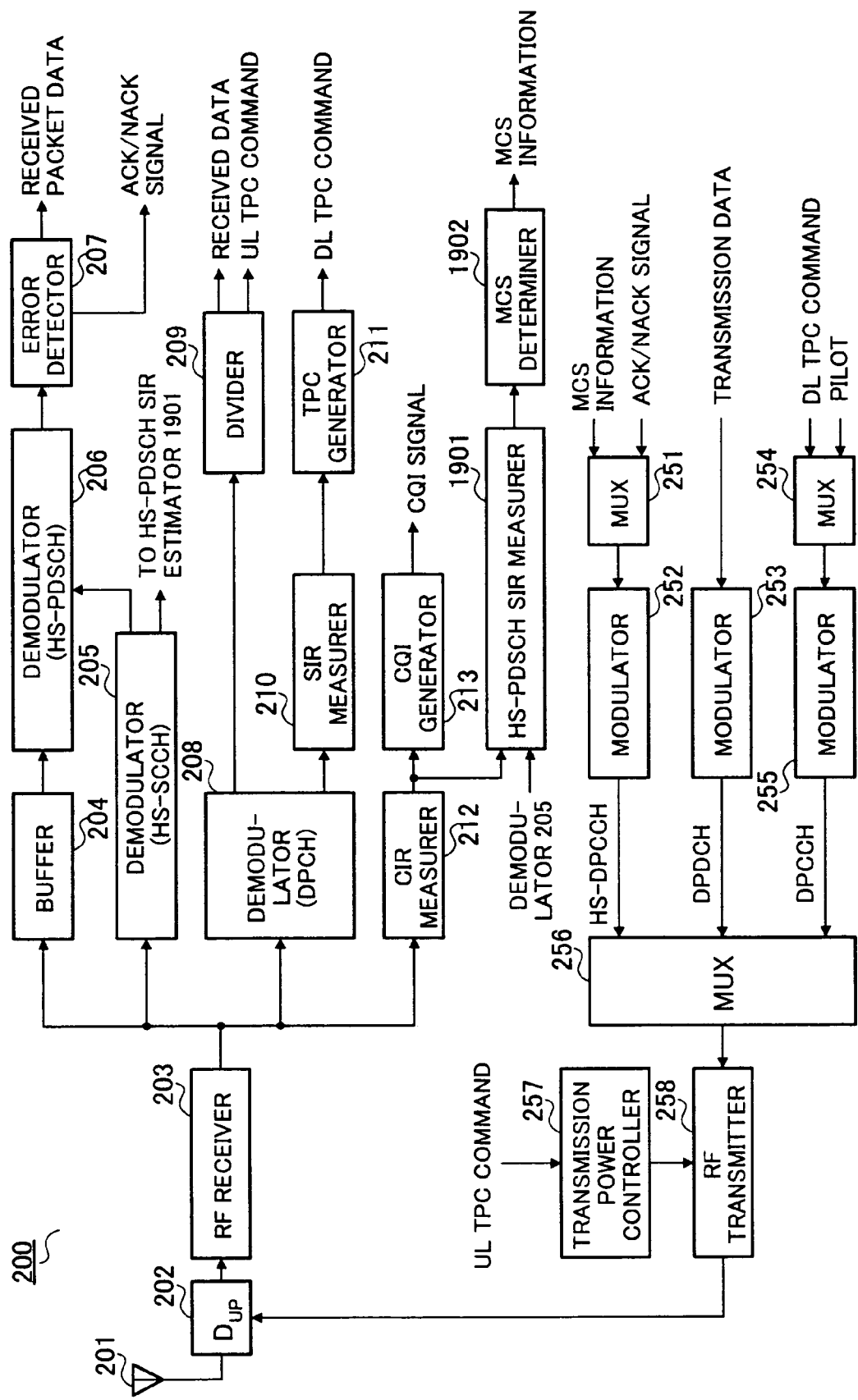
FIG. 21 is a block diagram showing a configuration of a communication terminal apparatus according to Embodiment 8 of the present invention.

FIG. 21 is a block diagram showing the configuration of a communication terminal apparatus according to Embodiment 8 of the present invention. Parts in FIG. 21 that are identical to those of FIG. 4 will be assigned the same numerals as in FIG. 4 without further explanations. Demodulator 205 demodulates an HS-SCCH signal transmitted from the base station apparatus and extracts the HS-PDSCH transmission power information, and thereafter outputs the information to HS-PDSCH SIR estimator 1901.

HS-PDSCH SIR estimator 1901 estimates the HS-PDSCH SIR from the CIR representing the downlink channel quality Measured by CIR measurer 212 and the HS-PDSCH transmission power information output from demodulator 205, and outputs the result to MCS determiner 1902.

MCS determiner 1902 has a TBS table described in Embodiment 1 and Embodiment 2, searches for the TBS based on the value reported from the HS-PDSCH SIR estimator, determines the TBS, and determines the MCS that correspond to the determined TBS. The determined MCS and the TBS associated with the MCS are output to multiplexer (MUX) 251 as MCS information, subjected to predetermined transmission processing, and thereafter transmitted to the base station apparatus.

For the TBS table in MCS determiner 1902, the kind of TBS table is used in which each communication terminal apparatus is assigned an optimal TBS in accordance with the capability of the communication terminal apparatus, including, for example, the number of receivable codes and m-ary number.

By this means, the throughput improves on a per communication terminal apparatus basis, and with this the system throughput also improves.

Thus, according to the present embodiment, each communication terminal apparatus has a TBS table in accordance with the capability of the communication terminal apparatus and requests the MCS desirable to the communication terminal apparatus to the base station apparatus. Consequently, throughput improves on a per communication terminal apparatus basis. As a result, the system throughput improves.

A base station apparatus of the present invention employs a configuration having a transmission power determiner that determines a transmission power of a downlink channel signal based on transmission power resource; a quality estimator that estimates a signal quality at a communication terminal apparatus based on the transmission power determined by the transmission power determiner and a channel report value received from the communication terminal apparatus indicating a downlink channel quality; and an assigner that determines a maximum transport block size to satisfy a predetermined received quality according to the signal quality estimated by the quality estimator and assigns a combination of the number of codes and a modulation scheme corresponding to the determined transport block size.

According to this configuration, the maximum transport block size to satisfy a certain signal quality level is determined in accordance with the signal quality at the communication terminal apparatus estimated based on the transmission power of the downlink channel signal determined based on transmission power resources and the channel report value indicating the downlink channel quality, so that throughput improves.

A base station apparatus of the present invention employs a configuration in which an assigner determines a transport block size based on spreading code resources at the base station apparatus and the number of spreading codes and the modulation scheme within capability of a communication terminal apparatus.

According to this configuration, for example, a table is provided in advance that associates transport block sizes, numbers of spreading codes, and modulation schemes, and the transport block size is determined that corresponds to the code resources of the base station apparatus and the number of spreading codes and modulation scheme within the capability of the communication terminal apparatus, so that the time to search the table can be shortened.

A base station apparatus of the present invention employs a configuration in which an assigner determines a transport block size that will result in a greater code rate than a predetermined value.

According to this configuration, code rates are limited to above the predetermined value, and so the parity bits that can be transmitted upon the initial transmission are limited and the remaining parity bits are transmitted upon retransmission, so that, if a retransmission method is used whereby the code rate lowers upon every retransmission, a certain received quality level can be fulfilled at a lower count of retransmission.

A base station apparatus of the present invention employs a configuration, in which an assigner changes a predetermined value of a code rate according to a modulation scheme.

According to this configuration, for example, in case 16 QAM is used, which is more susceptible to errors than QPSK, by making the above predetermined value greater than in the case of QPSK, 16QAM that is susceptible to errors can fulfill a predetermined received quality level at a lower count of retransmission if a retransmission method is employed whereby the code rate lowers upon every retransmission.

A base station apparatus of the present invention employs a configuration in which, when a maximum transport block size that is determined to satisfy a predetermined received quality exceeds the amount of data awaiting transmission by more than a predetermined range, an assigner adjusts the transport block size such that the transport block size stays within a certain range from the amount of data awaiting transmission.

According to this configuration, when the maximum transport block size exceeds the amount of data awaiting transmission by more than a certain range, the transport block size is adjusted such that the transport block stays within a certain range from the amount of data awaiting transmission, so that padding processing needs not be performed and unnecessary processing can be spared, so that it is possible to use code resources and transmission power resources efficiently.

A base station apparatus of the present invention employs a configuration in which an assigner instructs a transmission power determiner to reduce the transmission power of a downlink channel signal to adjust a transport block size; and a transmission power determiner reduces the transmission power of the downlink channel signal as instructed by the assigner.

According to this configuration, the transmission power of the downlink channel signal is reduced to adjust the transport block size, so that it is possible to use transmission power resources efficiently.

A base station apparatus of the present invention employs a configuration, in which an assigner reduces the number of spreading codes to assign to adjust a transport block size.

According to this configuration, the number of spreading codes is reduced to adjust the transport block size, so that it is possible to use code resources efficiently.

A base station apparatus of the present invention employs a configuration in which an assigner reduces an m-ary number to adjust a transport block size.

According to this configuration, the m-ary number is reduced to adjust the transport block size, so that it is possible to improve the received quality.

A base station apparatus of the present invention employs a configuration in which an assigner reduces the number of spreading codes to assign and an m-ary number and instructs a transmission power determiner to reduce the transmission power of a downlink channel signal to adjust the transport block size, and a transmission power determiner reduces the transmission power of the downlink channel signal as instructed by the assigner.

According to this configuration, the transmission power, the number of spreading codes, and the m-ary number are reduced to adjust the transport block size, so tat it is possible to use transmission power resources and code resources efficiently and improve the received quality.

A base station apparatus of the present invention employs a configuration in which an assigner reduces the transmission power determined by a transmission power determiner and the number of codes corresponding to the maximum transport block size according to the ratio of the amount of data awaiting transmission to the maximum transport block size, to adjust the transport block size.

According to this configuration, even when the transport block size exceeds the amount of data awaiting transmission by more than a certain range, the transport block size is adjusted and the transport block size is not searched again, so that is possible shorten the time to determine the number of codes and modulation scheme. In addition, it is possible to use transmission power resources efficiently.

A communication terminal apparatus of the present invention employs a configuration having a receiver that receives a transmission power information about a downlink channel signal determined based on a transmission power resource; a quality measurer that measures a signal quality; and a requestor that determines a maximum transport block size to satisfy a predetermined received quality based on the transmission power information received by the receiver and the signal quality measured by the quality measurer, and requests the determined transport block size and a combination of the number of spreading codes and a modulation scheme corresponding to the transport block size to a base station apparatus.

According to this configuration, the transport block size is determined on a per communication terminal apparatus basis, and by thus taking into consideration the number of codes and modulation schemes and such within the capability of the communication terminal apparatus, it is possible to optimize the transport block size on a per communication terminal apparatus basis and improve throughput.

A transmission assignment method of the present invention has the steps of determining a transmission power of a downlink channel signal based on a transmission power resource; estimating a signal quality at a communication terminal apparatus based on the transmission power determined and a channel report value received from the communication terminal apparatus indicating a downlink channel quality; and determining a maximum transport block size to satisfy a predetermined received quality according to the signal quality estimated and assigning a combination of the number of codes and a modulation scheme corresponding to the transport block size determined.

According to this method, the maximum transport block size to satisfy a certain signal quality level is determined in accordance with the signal quality at the communication terminal apparatus estimated based on the transmission power of the downlink channel signal determined based on transmission power resources and the channel report value indicating the downlink channel quality, so that throughput improves.

As described above, according to the present invention, the combination of the number of codes and the modulation scheme that will lead to a TBS to fulfill a predetermined quality level is determined in accordance with the channel quality of the HS-PDSCH determined based on the transmission power resources, and, consequently, it is possible to perform transmission in optimum TBS and improve throughput in consideration of the transmission power of the HS-PDSCH.

The present application is based on Japanese Patent Application No. 2002-337257, filed Nov. 20, 2002, entire content of which is expressly incorporated herein by reference.

INDUSTRIAL APPLICABILITY

The present invention relates to a base station apparatus and a transmission assignment method in a wireless communication system that performs adaptive modulation in high speed downlink packet access, and is suitable for use, for example, in a base station apparatus.

The invention claimed is:

1. A base station apparatus, comprising:
a transmission power determiner that determines a transmission power of a downlink channel signal based on transmission power resource;
a quality estimator that estimates a signal quality at a communication terminal apparatus based on the transmission power determined by the transmission power determiner and a channel report value received from the communication terminal apparatus indicating a downlink channel quality; and
an assigner that determines a maximum transport block size to satisfy a predetermined received quality according to the signal quality estimated by the quality estimator and assigns a combination of the number of codes and a modulation scheme corresponding to the determined transport block size.

2. The base station apparatus of claim 1, wherein the assigner determines the transport block size based on a spreading code resource at the base station apparatus and the number of spreading codes and the modulation scheme within capability of the communication terminal apparatus.

3. The base station apparatus of claim 1, wherein the assigner determines the transport block size that will result in a greater code rate than a predetermined value.

4. The base station apparatus of claim 3, wherein the assigner changes the predetermined value of the code rate according to the modulation scheme.

5. The base station apparatus of claim 1, wherein, when a maximum transport block size that is determined to satisfy the predetermined received quality exceeds an amount of data awaiting transmission by more than a predetermined range, an assigner adjusts the transport block size such that the transport block size stays within a certain range from the amount of data awaiting transmission.

6. The base station apparatus of claim 5, wherein:
the assigner instructs the transmission power determiner to reduce the transmission power of the downlink channel signal to adjust the transport block size; and
the transmission power determiner reduces the transmission power of the downlink channel signal as instructed by said assigner.

7. The base station apparatus of claim 5, wherein the assigner reduces the number of spreading codes to assign to adjust the transport block size.

8. The base station apparatus of claim 5, wherein the assigner reduces an m-ary number to adjust the transport block size.

9. The base station apparatus of claim 5, wherein:
the assigner reduces the number of spreading codes to assign and an m-ary number and instructs the transmission power determiner to reduce the transmission power of the downlink channel signal to adjust the transport block size; and the transmission power determiner reduces the transmission power of the downlink channel signal as instructed by said assigner.

10. The base station apparatus of claim 5, wherein the assigner reduces the transmission power determined by the transmission power determiner and the number of codes corresponding to the maximum transport block size according to a ratio of the amount of data awaiting transmission to the maximum transport block size, to adjust the transport block size.

11. A communication terminal apparatus, comprising:

a receiver that receives a transmission power information about a downlink channel signal determined based on a transmission power resource;

a quality measurer that measures a signal quality; and a requester that determines a maximum transport block size to satisfy a predetermined received quality based on the transmission power information received by the receiver and the signal quality measured by the quality measurer, and requests the determined transport block size and a combination of the number of spreading codes and a modulation scheme corresponding to said transport block size to a base station apparatus.

12. A transmission assignment method, comprising:

determining a transmission power of a downlink channel signal based on a transmission power resource;

estimating a signal quality at a communication terminal apparatus based on the transmission power determined and a channel report value received from the communication terminal apparatus indicating a downlink channel quality; and determining a maximum transport block size to satisfy a predetermined received quality according to the signal quality estimated and assigning a combination of the number of codes and a modulation scheme corresponding to the transport block size determined.

* * * * *